US012649139B2

(12) United States Patent
Lee et al.

(10) Patent No.: US 12,649,139 B2
(45) Date of Patent: Jun. 9, 2026

(54) AMMONIFICATION DEVICE AND METHOD USING PLASMA DISCHARGING IN WATER

(71) Applicant: KOREA INSTITUTE OF MACHINERY & MATERIALS, Daejeon (KR)

(72) Inventors: Dae-hoon Lee, Daejeon (KR); You-Na Kim, Daejeon (KR); Hong Jae Kang, Daejeon (KR); Hohyun Song, Daejeon (KR); Heesoo Lee, Daejeon (KR); Younghoon Song, Daejeon (KR); Kwan-Tae Kim, Daejeon (KR); Iqbal Muzammil, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 746 days.

(21) Appl. No.: 18/025,015

(22) PCT Filed: Sep. 7, 2021

(86) PCT No.: PCT/KR2021/012158

§ 371 (c)(1),
(2) Date: Mar. 7, 2023

(87) PCT Pub. No.: WO2022/050822

PCT Pub. Date: Mar. 10, 2022

(65) Prior Publication Data

US 2024/0286105 A1 Aug. 29, 2024

(30) Foreign Application Priority Data

Sep. 7, 2020 (KR) ........................ 10-2020-0114011

(51) Int. Cl.

*B01J 19/00* (2006.01)
*B01J 6/00* (2006.01)

(Continued)

(52) U.S. Cl.

CPC ............ *B01J 19/088* (2013.01); *B01J 6/008* (2013.01); *B01J 19/0013* (2013.01);

(Continued)

(58) Field of Classification Search

CPC ...... B01J 19/088; B01J 6/008; B01J 19/0013; B01J 19/126; B01J 2219/0869;

(Continued)

(56) References Cited

FOREIGN PATENT DOCUMENTS

| | | |
|---|---|---|
| EP | 31622435 | 3/2020 |
| JP | 2012-154241 | 8/2012 |

(Continued)

OTHER PUBLICATIONS

JP-2015189639A—machine translation (Year: 2026).*

(Continued)

*Primary Examiner* — Huy Tram Nguyen
(74) *Attorney, Agent, or Firm* — LEX IP MEISTER, PLLC

(57) ABSTRACT

An apparatus for producing ammonia using electric discharge of water according to an embodiment of the present invention includes a plasma decomposition reaction part configured to produce hydrogen ($H_2$) and oxygen ($O_2$) from water by supplying the water to plasma generated by using nitrogen gas ($N_2$) as electric discharge gas and produce nitrogen monoxide (NO) and nitrogen dioxide ($NO_2$) by allowing oxygen ($O_2$) to react with nitrogen ($N_2$), a thermal decomposition reaction part connected to a lower side of the plasma decomposition reaction part and configured to produce solid carbon and hydrogen ($H_2$) by decomposing water and hydrocarbon by further supplying hydrocarbon or hydrogen to an additional supply port, and a synthetic catalyst part connected to the thermal decomposition reaction part and configured to produce ammonia ($NH_3$) by (Continued)

synthesizing hydrogen ($H_2$) and nitrogen monoxide (NO) separated from water.

20 Claims, 16 Drawing Sheets

(51) Int. Cl.

| | |
|---|---|
| ***B01J 19/08*** | (2006.01) |
| ***B01J 19/12*** | (2006.01) |
| ***C01B 3/24*** | (2006.01) |
| ***C01C 1/04*** | (2006.01) |

(52) U.S. Cl.
CPC ............... *B01J 19/126* (2013.01); *C01B 3/24* (2013.01); *C01C 1/0417* (2013.01); *B01J 2219/0869* (2013.01); *B01J 2219/0871* (2013.01); *B01J 2219/0883* (2013.01); *B01J 2219/0896* (2013.01); *B01J 2219/1269* (2013.01); *C01B 2203/0272* (2013.01); *C01B 2203/068* (2013.01); *C01B 2203/0883* (2013.01)

(58) Field of Classification Search
CPC ........ B01J 2219/0871; B01J 2219/0883; B01J 2219/0896; B01J 2219/1269; B01J 2219/0894; B01J 2219/0898; B01J 2219/1248; B01J 19/245; B01J 19/32; C01B 3/24; C01B 2203/0272; C01B 2203/068; C01B 2203/0883; C01B 3/025; C01B 3/042; C01B 3/342; C01C 1/0417; C01C 1/0447; C01C 1/0494; C01C 1/04; Y02E 60/36
USPC .......................................................... 422/148
See application file for complete search history.

(56) References Cited

FOREIGN PATENT DOCUMENTS

| | | | | | |
|---|---|---|---|---|---|
| JP | 2015189639 A | * | 11/2015 | | |
| KR | 10-2009-0065810 | | 6/2009 | | |
| KR | 10-2017-0075514 | | 7/2017 | | |
| KR | 101982171 B1 | * | 5/2019 | .............. | B01J 8/008 |

OTHER PUBLICATIONS

KR-101982171B1—machine translation (Year: 2026).*
Hrishikesh Patel et al., "Plasma-Activated Electrolysis for Cogeneration of Nitric Oxide and Hydrogen from Water and Nitrogen," ACS Energy Lett. 2019, 4, 2091-2095, Aug. 8, 2019.
Ryan Hawtof et al., "Catalyst-free, highly selective synthesis of ammonia from nitrogen and water by a plasma electrolytic system," Science Advances, 2019, 5, 1, Jan. 11, 2019.
EPO, Extended European Search Report of the corresponding European Patent Application No. 21864777.4., dated Nov. 25, 2024, total 4 pages.

* cited by examiner

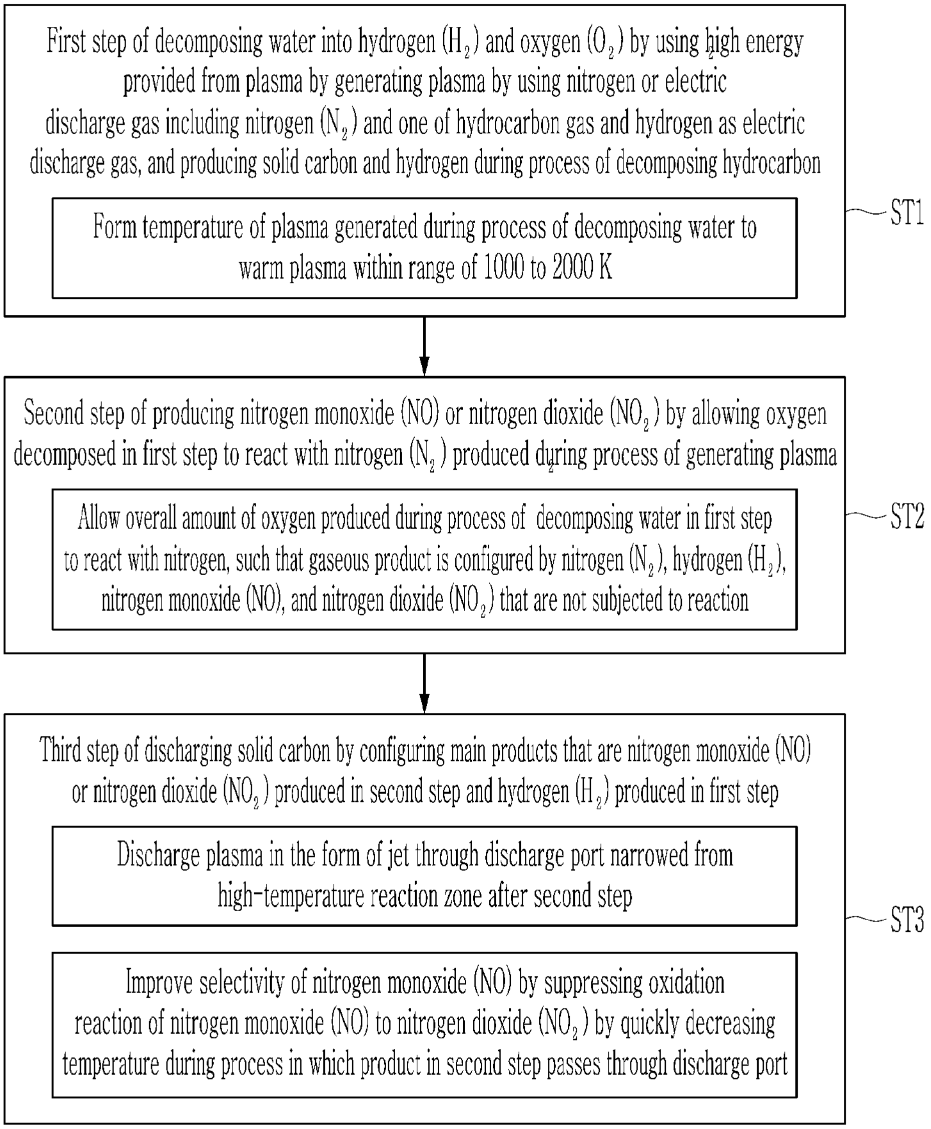

FIG. 10

First step of decomposing water into hydrogen ($H_2$) and oxygen ($O_2$) by using high energy provided from plasma by generating plasma by using nitrogen or electric discharge gas including nitrogen ($N_2$) and one of hydrocarbon gas and hydrogen as electric discharge gas, and producing solid carbon and hydrogen during process of decomposing hydrocarbon > Form temperature of plasma generated during process of decomposing water to warm plasma within range of 1000 to 2000 K

~ST1

Second step of producing nitrogen monoxide (NO) or nitrogen dioxide ($NO_2$) by allowing oxygen decomposed in first step to react with nitrogen ($N_2$) produced during process of generating plasma > Allow overall amount of oxygen produced during process of decomposing water in first step to react with nitrogen, such that gaseous product is configured by nitrogen ($N_2$), hydrogen ($H_2$), nitrogen monoxide (NO), and nitrogen dioxide ($NO_2$) that are not subjected to reaction

~ST2

Third step of discharging solid carbon by configuring main products that are nitrogen monoxide (NO) or nitrogen dioxide ($NO_2$) produced in second step and hydrogen ($H_2$) produced in first step > Discharge plasma in the form of jet through discharge port narrowed from high-temperature reaction zone after second step > Improve selectivity of nitrogen monoxide (NO) by suppressing oxidation reaction of nitrogen monoxide (NO) to nitrogen dioxide ($NO_2$) by quickly decreasing temperature during process in which product in second step passes through discharge port

~ST3

AMMONIFICATION DEVICE AND METHOD USING PLASMA DISCHARGING IN WATER

TECHNICAL FIELD

The present invention relates to an apparatus and method for producing ammonia by using electric discharge of water, and more particularly, to an apparatus and method for producing ammonia by using electric discharge of water, which produce nitrogen monoxide (NO) by allowing produced oxygen to react with nitrogen ($N_2$) to remove oxygen ($O_2$) produced together with hydrogen ($H_2$) by using electrical energy and plasma and using water as a raw material, and produce ammonia ($NH_3$) with nitrogen monoxide (NO) by means of a synthetic catalyst.

BACKGROUND ART

It is known that ammonia is one of the representative compounds that have changed human life. The agricultural productivity made by humanity has been rapidly improved by virtue of artificial synthesis of ammonia, and the Haber-Bosch process enables the artificial synthesis of ammonia. The Haber-Bosch process synthesizes ammonia directly from nitrogen and hydrogen. However, the Haber-Bosch process requires a condition of high pressure of about 200 atm and a high-temperature of about 400 to 500° C., which causes a problem in that the amount of energy costs of the process is very large. 2% or more of annual energy consumption used by the general population is used to produce ammonia. Therefore, various studies have been conducted on reactions that may be substituted for the Haber-Bosch process, there has been no considerable performance. Due to the characteristics of the Haber-Bosch process that may be performed under a high-temperature, high-pressure condition, ammonia production processes are performed in large-scale plants.

Meanwhile, in the case of new renewable energy, surplus electric power is generated at ordinary times because a range of fluctuation in electric power production is large because of the nature of energy source. Because the amount of generation of the surplus electric power varies over time, it is difficult to predict the amount of generation of the surplus electric power. Therefore, if there is an application that may quickly follow the fluctuation in load over time, the possibility of utilizing discarded energy will be implemented. With this background, a very innovative utilization method may be derived in an energy system if an ammonia production reaction may be obtained with energy costs similar to energy costs of the Haber-Bosch process under a condition of normal pressure or pressure, which corresponds to the normal pressure but is not high, so as to quickly cope with the fluctuation in load.

The reason why the amount of process costs is large in the Haber-Bosch process is that a process of decomposing nitrogen requires very high activation energy. To obtain a high yield, a catalyst reaction is performed under a high-temperature, high-pressure condition, a large amount of process costs is incurred during the process of the catalyst reaction.

In contrast, plasma is advantageous in very easily forming a high-temperature condition in which nitrogen may be decomposed. Nitrogen may be decomposed even in case that only plasma is applied, but a reaction for converting nitrogen into ammonia is not induced.

Meanwhile, in case that plasma is applied to obtain hydrogen by decomposing water, water is decomposed at a high temperature typically provided by the plasma, such that hydrogen and oxygen are produced. However, there is a risk of explosion because hydrogen and oxygen are mixed in a product when water is decomposed by the plasma. For this reason, there are problems in that a separator is required to decompose water, and it is difficult to perform an operation when a hydrogen concentration is high.

In case that electric discharge is performed by nitrogen gas ($N_2$) in a water ambience, nitrogen monoxide (NO) and hydrogen ($H_2$) may be produced, and ammonia ($NH_3$) may be synthesized from NO and H. However, a ratio between NO and $H_2$ produced in this case is close to 1:1 that is smaller than 1:1.5 suitable for synthesizing $NH_3$ on a catalyst, such that hydrogen is insufficient, and a yield of synthesis of $NH_3$ deteriorates.

DISCLOSURE

Technical Problem

The present invention has been made in an effort to provide an apparatus and method for producing ammonia by using electric discharge of water, which produce hydrogen ($H_2$) by using water as a raw material and using plasma generated by electric discharge gas including nitrogen gas ($N_2$) and one of hydrocarbon gas and hydrogen, produce nitrogen monoxide (NO) by allowing oxygen ($O_2$), which is produced together with hydrogen ($H_2$) during a process of generating nitrogen plasma, to react with nitrogen ($N_2$), produce solid carbon and hydrogen ($H_2$) during a process of decomposing hydrocarbon (hydrocarbon or hydrogen may be additionally supplied), and produce ammonia from hydrogen and nitrogen monoxide (NO) by using a synthetic catalyst.

The present invention has also been made in an effort to provide an apparatus and method for producing ammonia by using electric discharge of water, which produce hydrogen ($H_2$) by using water as a raw material and using plasma generated by using nitrogen gas ($N_2$) as electric discharge gas, produce nitrogen monoxide (NO) by allowing oxygen ($O_2$), which is produced together with hydrogen ($H_2$) in this process, to react with nitrogen ($N_2$), produce solid carbon and hydrogen ($H_2$) during a process of decomposing water and hydrocarbon by supplying hydrocarbon or hydrogen, and produce ammonia from hydrogen and nitrogen monoxide (NO) by using a synthetic catalyst.

The present invention has also been made in an effort to provide an apparatus and method for producing ammonia by using electric discharge of water, which use solid carbon, which is produced during a process of decomposing hydrocarbon, separately from ammonia, which reduces ammonia production costs.

Technical Solution

An exemplary embodiment of the present invention provides an apparatus for producing ammonia by using electric discharge of water, the apparatus including: a plasma decomposition reaction part configured to produce hydrogen ($H_2$) and oxygen ($O_2$) from water by supplying the water to plasma generated by electric discharge gas including nitrogen gas ($N_2$) and any one of hydrocarbon gas and hydrogen, produce nitrogen monoxide (NO) and nitrogen dioxide ($NO_2$) by allowing oxygen ($O_2$) to react with nitrogen ($N_2$), and produce solid carbon and hydrogen ($H_2$) during a process of decomposing hydrocarbon; a thermal decomposition reaction part connected to a lower side of the plasma decomposition reaction part and configured to produce solid carbon and hydrogen ($H_2$) by decomposing water and hydrocarbon; and a synthetic catalyst part connected to the thermal decomposition reaction part and configured to produce ammonia ($NH_3$) by synthesizing hydrogen ($H_2$) and nitrogen monoxide (NO) separated from water. @@@($NH_3$)를

The plasma decomposition reaction part may further supply hydrocarbon or hydrogen to an additional supply port.

The apparatus for producing ammonia by using electric discharge of water according to the exemplary embodiment of the present invention may further include a heat exchange part embedded in the thermal decomposition reaction part between the plasma decomposition reaction part and the synthetic catalyst part and configured to control a temperature to a temperature suitable for a catalyst reaction of the synthetic catalyst by cooling exhaust gas including nitrogen monoxide (NO), nitrogen dioxide ($NO_2$), and hydrogen ($H_2$) discharged from the plasma decomposition reaction part.

The heat exchange part may absorb heat of an internal space by using low-temperature water supplied to an inlet, and an outlet of the heat exchange part may be connected to a water supply part configured to supply water to the plasma decomposition reaction part.

The apparatus for producing ammonia by using electric discharge of water according to the exemplary embodiment of the present invention may further include: an ammonia recovery part disposed at a downstream side of the synthetic catalyst part and configured to recover the synthesized ammonia ($NH_3$); and a gas separation part configured to separate hydrogen and nitrogen from exhaust gas having passed through the ammonia recovery part.

The plasma decomposition reaction part may include: a housing electrically grounded and having an electric discharge space therein and a discharge port having a narrowed passageway at an end thereof; a high-voltage electrode mounted at one side of the housing, connected to high voltage, and configured to generate plasma electric discharge in the electric discharge space; an electric discharge gas supply port configured to supply the electric discharge gas to one side of the high-voltage electrode; a water supply part configured to produce hydrogen ($H_2$) and oxygen ($O_2$) from water by supplying water to plasma at a front side of the high-voltage electrode, produce nitrogen monoxide (NO) by allowing oxygen ($O_2$) to react with nitrogen ($N_2$), and discharge hydrogen ($H_2$) and nitrogen monoxide (NO) to the discharge port; and an expanded part connected to the discharge port and connected to an extension part of the thermal decomposition reaction part in a state in which a passageway is widened so that the solid carbon produced in the electric discharge space flows downward to the extension part together with the supplied water.

The water supply part may include a water spray nozzle configured to spray water or a steam supply port configured to supply steam.

The water spray nozzle may be installed in the housing and disposed at a middle portion based on a longitudinal direction of the electric discharge space, and the water spray nozzle may spray water to an plasma arc of the plasma electric discharge.

The apparatus for producing ammonia by using electric discharge of water according to the exemplary embodiment of the present invention may further include a recovery tub provided below the thermal decomposition reaction part and configured to store the supplied water and the solid carbon between solid carbon and hydrogen ($H_2$) produced in the plasma decomposition reaction part and discharge the solid carbon to a carbon discharge port, in which the synthetic catalyst part is connected to a discharge port provided at a lateral side of a lower end of the thermal decomposition reaction part.

The plasma decomposition reaction part may include: a housing electrically grounded having an electric discharge space therein and a discharge port provided at an end thereof; a high-voltage electrode mounted at one side of the housing, connected to high voltage, and configured to generate plasma electric discharge in the electric discharge space; an electric discharge gas supply port configured to supply the electric discharge gas to one side of the high-voltage electrode; a connection part having a narrowed part having a narrowed passageway in the electric discharge space, and the discharge port connected to the narrowed part and provided at the end thereof; a water supply part installed on the connection part at an end of the narrowed part and configured to produce hydrogen ($H_2$) and oxygen ($O_2$) from water by supplying the water to an end of a plasma arc of the plasma electric discharge, produce nitrogen monoxide (NO) by allowing oxygen ($O_2$) to react with nitrogen ($N_2$), and discharge hydrogen ($H_2$) and nitrogen monoxide (NO) to the discharge port; and an expanded part connected to the discharge port and connected to an extension part of the thermal decomposition reaction part in a state in which a passageway is widened so that the solid carbon produced in the electric discharge space flows downward to the extension part together with the supplied water.

The plasma decomposition reaction part may include: a housing electrically grounded and having an electric discharge space therein and a discharge port having a narrowed passageway at an end thereof; a high-voltage electrode mounted at one side of the housing, connected to high voltage, and configured to generate plasma electric discharge in the electric discharge space; an electric discharge gas supply port configured to supply the electric discharge gas to one side of the high-voltage electrode; a water supply part formed on the high-voltage electrode and configured to produce hydrogen ($H_2$) and oxygen ($O_2$) from water by supplying the water to an outer periphery of a plasma arc of the plasma electric discharge, produce nitrogen monoxide (NO) by allowing oxygen ($O_2$) to react with nitrogen ($N_2$), and discharge hydrogen ($H_2$) and nitrogen monoxide (NO) to the discharge port; and an expanded part connected to the discharge port and connected to an extension part of the thermal decomposition reaction part in a state in which a passageway is widened so that the solid carbon produced in the electric discharge space flows downward to the extension part together with the supplied water.

The plasma decomposition reaction part may include: a housing electrically grounded and having an electric discharge space therein and a discharge port having a narrowed passageway at an end thereof; a high-voltage electrode mounted at one side of the housing, connected to high voltage, and configured to generate plasma electric discharge in the electric discharge space; an electric discharge gas supply port configured to supply the electric discharge gas to one side of the high-voltage electrode; a water supply part formed on the high-voltage electrode and configured to produce hydrogen ($H_2$) and oxygen ($O_2$) from water by supplying the water to a front side of a plasma arc of the plasma electric discharge, produce nitrogen monoxide (NO) by allowing oxygen ($O_2$) to react with nitrogen ($N_2$), and discharge hydrogen ($H_2$) and nitrogen monoxide (NO) to the discharge port; and an expanded part connected to the discharge port and connected to an extension part of the thermal decomposition reaction part in a state in which a passageway is widened so that the solid carbon produced in the electric discharge space flows downward to the extension part together with the supplied water.

The water supply part may include a water spray nozzle, and a tip of the water spray nozzle may be positioned to be inserted into the high-voltage electrode.

The discharge port may be configured as a nozzle having a converging-diverging structure and sprays water to plasma and nitrogen gas plasma so that a produced product is cooled while being discharged through the discharge port.

The plasma decomposition reaction part may include: an induced-coupled dielectric tube having an electric discharge space therein and a discharge port having a narrowed passageway at an end thereof; an electric discharge coil provided at an outer periphery of the induced-coupled dielectric tube and configured to generate induced coupled plasma electric discharge in the electric discharge space; an electric discharge gas supply port configured to supply electric discharge gas including hydrocarbon gas and nitrogen gas ($N_2$) to one side of the induced-coupled dielectric tube; a water supply part configured to produce hydrogen ($H_2$) and oxygen ($O_2$) from water by supplying the water to induced coupled plasma in the electric discharge space, produce nitrogen monoxide (NO) by allowing oxygen ($O_2$) to react with nitrogen ($N_2$), and discharge hydrogen ($H_2$) and nitrogen monoxide (NO) to the discharge port; and an expanded part connected to the discharge port and connected to an extension part of the thermal decomposition reaction part in a state in which a passageway is widened so that the solid carbon produced in the electric discharge space flows downward to the extension part together with the supplied water.

The water supply part may include a water spray nozzle configured to spray water. The water supply part may include a steam supply port configured to supply steam.

The water supply part may be provided at one side based on a longitudinal direction of the induced-coupled dielectric tube and supply water to the induced coupled plasma in the electric discharge space.

The plasma decomposition reaction part may include: an induced-coupled dielectric tube having an electric discharge space therein and a discharge port having a narrowed passageway at an end thereof; an electric discharge coil provided at an outer periphery of the induced-coupled dielectric tube and configured to generate induced coupled plasma electric discharge in the electric discharge space; an electric discharge gas supply port configured to supply electric discharge gas including hydrocarbon gas and nitrogen gas ($N_2$) to one side of the induced-coupled dielectric tube; a water supply part provided at a front side of the electric discharge coil based on a longitudinal direction of the induced-coupled dielectric tube, the water supply part being configured to produce hydrogen ($H_2$) and oxygen ($O_2$) from water by supplying the water to induced coupled plasma in the electric discharge space, produce nitrogen monoxide (NO) by allowing oxygen ($O_2$) to react with nitrogen ($N_2$), and discharge hydrogen ($H_2$) and nitrogen monoxide (NO) to the discharge port; and an expanded part connected to the discharge port and connected to an extension part of the thermal decomposition reaction part in a state in which a passageway is widened so that the solid carbon produced in the electric discharge space flows downward to the extension part together with the supplied water.

The plasma decomposition reaction part may include: a housing having an electric discharge space therein and a discharge port narrowed at an end thereof; a microwave guide provided outside the housing and configured to generate microwave plasma in the electric discharge space; an electric discharge gas supply port configured to supply the electric discharge gas to one side of the housing; a water supply part configured to produce hydrogen ($H_2$) and oxygen ($O_2$) from water by supplying the water to plasma in the electric discharge space, produce nitrogen monoxide (NO) by allowing oxygen ($O_2$) to react with nitrogen ($N_2$), and discharge hydrogen ($H_2$) and nitrogen monoxide (NO) to the discharge port; and an expanded part connected to the discharge port and connected to an extension part of the thermal decomposition reaction part in a state in which a passageway is widened so that the solid carbon produced in the electric discharge space flows downward to the extension part together with the supplied water.

The water supply part may include a water spray nozzle configured to spray water or a steam supply port configured to supply steam.

The water supply part may be provided at one side based on a longitudinal direction of the housing and supply water to the plasma in the electric discharge space.

The apparatus for producing ammonia by using electric discharge of water according to the exemplary embodiment of the present invention may further include a recovery tub connected to the thermal decomposition reaction part and configured to store the supplied water and the solid carbon between solid carbon and hydrogen ($H_2$) produced in the plasma decomposition reaction part and the water decomposition reaction part to a carbon discharge port, in which the synthetic catalyst part is connected to a discharge port provided in a connection part of the plasma decomposition reaction part.

The apparatus for producing ammonia by using electric discharge of water according to the exemplary embodiment of the present invention may further include a heat exchange part provided between a discharge port of the thermal decomposition reaction part and the synthetic catalyst part.

The apparatus for producing ammonia by using electric discharge of water according to the exemplary embodiment of the present invention may further include a heat exchange part disposed above a discharge port of the thermal decomposition reaction part and provided inside the thermal decomposition reaction part.

The thermal decomposition reaction part and a recovery tub may be connected by a contracted part having a narrowed passageway and a second expanded part having a widened passageway, the contracted part and the second expanded part may be connected by a narrowed second connection part, and the synthetic catalyst part may be connected to a discharge port provided in the second connection part.

Another exemplary embodiment of the present invention provides a method of producing ammonia by using electric discharge of water, the method including: a tenth step of discharging exhaust gas including nitrogen ($N_2$), nitrogen monoxide (NO), nitrogen dioxide ($NO_2$), and hydrogen ($H_2$) by supplying water to plasma generated by electric discharge gas including nitrogen gas and any one of hydrocarbon gas and hydrogen, and primarily discharging solid carbon and hydrogen ($H_2$) obtained during a process of decomposing hydrocarbon; a twentieth step of secondarily discharging solid carbon and hydrogen ($H_2$) obtained by decomposing water and hydrocarbon after the tenth step; and a thirtieth step of synthesizing ammonia by supplying exhaust gas including nitrogen ($N_2$), nitrogen monoxide (NO), nitrogen dioxide ($NO_2$), and hydrogen ($H_2$), which are products in the tenth step and the twentieth step, to a discharge synthetic catalyst, and discharging the synthesized ammonia.

In the twentieth step, hydrocarbon or hydrogen may be further supplied to an additional supply port.

The twentieth step may further include a twenty-first step of performing heat exchange under a temperature condition suitable for a catalyst reaction to supply a product to the synthetic catalyst for ammonia synthesis.

The thirtieth step may further include a thirty-first step of recovering synthesized liquid ammonia ($NH_3$) by separating the ammonia ($NH_3$) from the remaining gas at room temperature after ammonia synthesis.

The thirtieth step may further include a thirty-second step of separating hydrogen and nitrogen from the remaining exhaust gas after the thirty-first step.

The tenth step may include: a first step of generating plasma by using electric discharge gas, decomposing water into hydrogen ($H_2$) and oxygen ($O_2$) by using high energy provided from the plasma, and producing solid carbon and hydrogen ($H_2$) during a process of decomposing hydrocarbon; a second step of producing nitrogen monoxide (NO) or nitrogen dioxide ($NO_2$) by allowing oxygen decomposed in the first step to react with nitrogen ($N_2$) produced during a process of generating plasma; and a third step of discharging main products configured by nitrogen monoxide (NO) or nitrogen dioxide ($NO_2$) produced in the second step and hydrogen ($H_2$) produced in the first step, and discharging the solid carbon together with water.

In the first step, a temperature of plasma, which is generated during a process of decomposing water, may be generated to warm plasma within a range of 1000 to 2000 K.

In the second step, an overall amount of oxygen, which is produced during a process of decomposing water in the first step, may react with nitrogen, such that a gaseous product is configured by nitrogen ($N_2$), hydrogen ($H_2$), nitrogen monoxide (NO), and nitrogen dioxide ($NO_2$) that are not subjected to a reaction.

In the third step, the plasma may be discharged in the form of a jet through a discharge port narrowed from a high-temperature reaction zone after the second step, and a temperature may be quickly decreased during a process in which the second step product passes through the discharge port, such that an oxidation reaction of nitrogen monoxide (NO) to nitrogen dioxide ($NO_2$) is suppressed, and selectivity of nitrogen monoxide (NO) is improved.

In the third step, a temperature may be quickly decreased during a process in which the plasma passes through a heat exchange part provided in a discharge port narrowed from a high-temperature reaction zone after the second step, such that an oxidation reaction of nitrogen monoxide (NO) to nitrogen dioxide ($NO_2$) is suppressed, and selectivity of nitrogen monoxide (NO) is improved.

Still another exemplary embodiment of the present invention provides an apparatus for producing ammonia using electric discharge of water, the apparatus including: a plasma decomposition reaction part configured to produce hydrogen ($H_2$) and oxygen ($O_2$) from water by supplying the water to plasma generated by using nitrogen gas ($N_2$) as electric discharge gas and produce nitrogen monoxide (NO) and nitrogen dioxide ($NO_2$) by allowing oxygen ($O_2$) to react with nitrogen ($N_2$); a thermal decomposition reaction part connected to a lower side of the plasma decomposition reaction part and configured to produce solid carbon and hydrogen ($H_2$) by decomposing water and hydrocarbon by further supplying hydrocarbon or hydrogen to an additional supply port; and a synthetic catalyst part connected to the thermal decomposition reaction part and configured to produce ammonia ($NH_3$) by synthesizing hydrogen ($H_2$) and nitrogen monoxide (NO) separated from water.

Yet another exemplary embodiment of the present invention provides a method of producing ammonia by using electric discharge of water, the method including: a tenth step of discharging exhaust gas including nitrogen ($N_2$), nitrogen monoxide (NO), nitrogen dioxide ($NO_2$), and hydrogen ($H_2$) by supplying water to plasma generated by using nitrogen gas as electric discharge gas; a twentieth step of discharging solid carbon and hydrogen ($H_2$) obtained by decomposing water and hydrocarbon by further supplying hydrocarbon or hydrogen after the tenth step; and a thirtieth step of synthesizing ammonia by supplying exhaust gas including nitrogen ($N_2$), nitrogen monoxide (NO), nitrogen dioxide ($NO_2$), and hydrogen ($H_2$), which are products in the tenth step and the twentieth step, to a discharge synthetic catalyst, and discharging the synthesized ammonia.

Advantageous Effect

According to the apparatus and method for producing ammonia by using electric discharge of water according to the embodiment of the present invention, the plasma electric discharge may be generated in the plasma decomposition reaction part by supplying the electric discharge gas including nitrogen gas ($N_2$) and any one of hydrocarbon gas (e.g., a tiny amount of methane) and hydrogen to the electric discharge gas supply port, hydrogen ($H_2$) and oxygen ($O_2$) may be produced from water by supplying water to plasma by the water supply part, hydrogen ($H_2$) may be obtained by producing nitrogen monoxide (NO) and nitrogen dioxide ($NO_2$) by allowing oxygen ($O_2$) to react with nitrogen ($N_2$) to remove the produced oxygen ($O_2$), and solid carbon and hydrogen ($H_2$) may be produced during the process of decomposing hydrocarbon. In case that hydrocarbon or hydrogen is additionally supplied, solid carbon and hydrogen ($H_2$) may be further produced.

In addition, according to the apparatus and method for producing ammonia by using electric discharge of water according to the embodiment of the present invention, hydrogen ($H_2$) may be produced by using water as a raw material and using plasma generated by using nitrogen gas ($N_2$) as electric discharge gas, nitrogen monoxide (NO) may be produced by allowing produced oxygen ($O_2$) to react with nitrogen ($N_2$) to remove oxygen ($O_2$) produced together with hydrogen ($H_2$), solid carbon and hydrogen ($H_2$) may be produced during a process of decomposing water and hydrocarbon by supplying hydrocarbon or hydrogen, and ammonia may be produced from hydrogen and nitrogen monoxide (NO) by using a synthetic catalyst.

In addition, according to the apparatus and method for producing ammonia by using electric discharge of water according to the embodiment of the present invention, ammonia ($NH_3$) may be produced by synthesizing hydrogen ($H_2$) and nitrogen monoxide (NO) by using the synthetic catalyst part. In this case, the plasma decomposition reaction part and the thermal decomposition reaction part may simultaneously produce solid carbon during the process of producing ammonia ($NH_3$), which makes it possible to reduce ammonia production costs in case that carbon is utilized.

DESCRIPTION OF THE DRAWINGS

FIG. 10 is a flowchart illustrating a process of producing carbon, hydrogen, and nitrogen monoxide in the method of producing ammonia by using electric discharge of water in FIG. 9.

MODE FOR INVENTION

Figure 1:
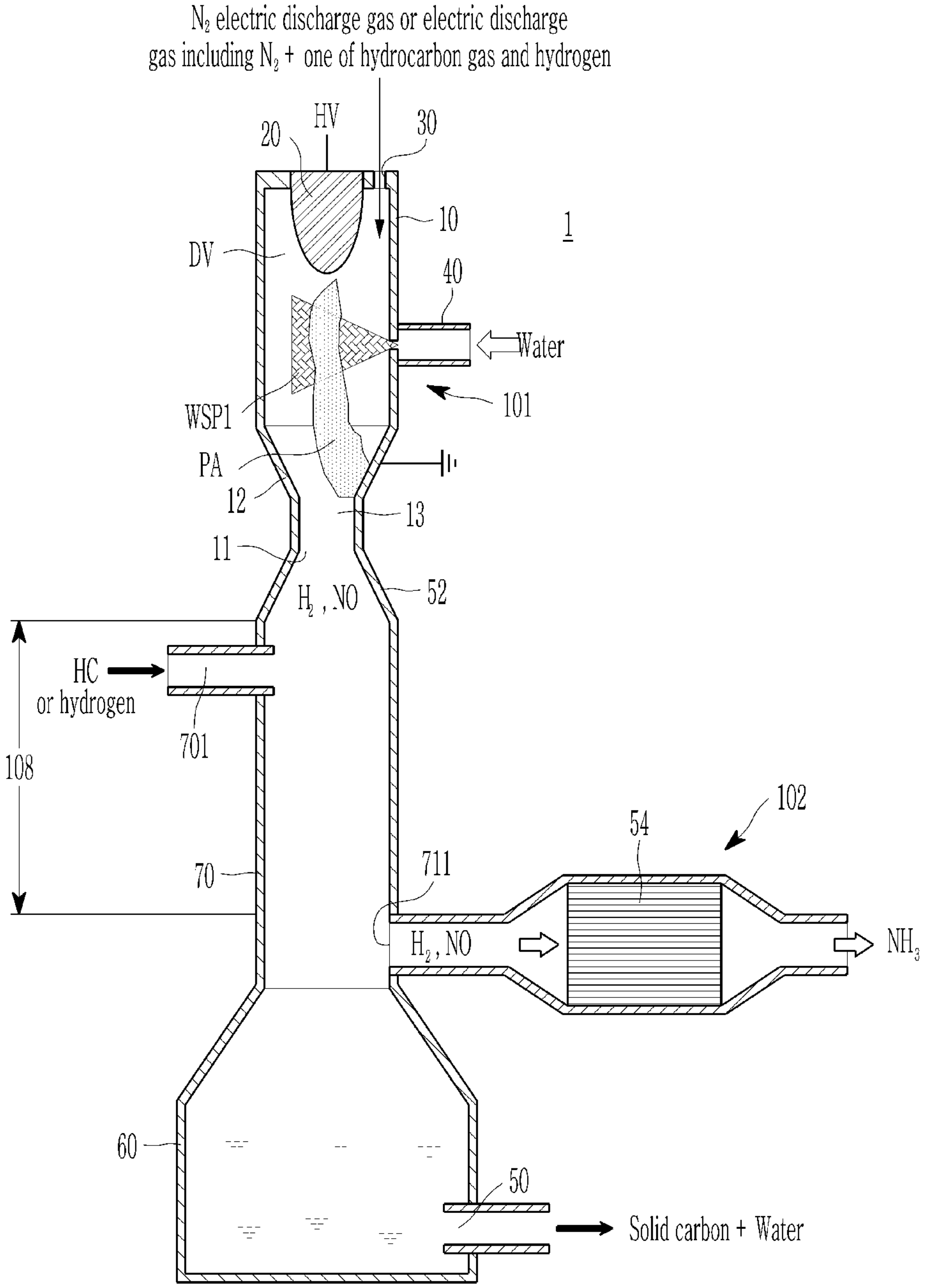
FIG. 1 is a configuration view of an apparatus for producing ammonia by using electric discharge of water according to a first embodiment of the present invention.

Hereinafter, embodiments of the present invention will be described in detail with reference to the accompanying drawings so that those with ordinary skill in the art to which the present invention pertains may easily carry out the embodiments. However, the present invention may be implemented in various different ways and is not limited to the embodiments described herein. In the drawings, a part irrelevant to the description will be omitted to clearly describe the present invention, and the same or similar constituent elements will be designated by the same reference numerals throughout the specification.

FIG. 1 is a configuration view of an apparatus for producing ammonia by using electric discharge of water according to a first embodiment of the present invention. Referring to FIG. 1, an apparatus 1 for producing ammonia by using electric discharge of water according to a first embodiment includes a plasma decomposition reaction part 101, a thermal decomposition reaction part 108, and a synthetic catalyst part 102.

The plasma decomposition reaction part 101 is configured to produce hydrogen ($H_2$) and oxygen ($O_2$) from water by using electric discharge of water by supplying (e.g., spraying) water to plasma generated by electric discharge gas including nitrogen gas ($N_2$) and any one of hydrocarbon gas and hydrogen, produce nitrogen monoxide (NO) and nitrogen dioxide ($NO_2$) by allowing oxygen ($O_2$) to react with nitrogen ($N_2$), and produce solid carbon and hydrogen ($H_2$) during a process of decomposing hydrocarbon.

The thermal decomposition reaction part 108 is connected to a lower side of the plasma decomposition reaction part 101 and configured to produce solid carbon and hydrogen ($H_2$) by decomposing water and hydrocarbon by further supplying hydrogen or hydrocarbon (HC) such as methane to an additional supply port 701. The additional supply of hydrocarbon (HC) or hydrogen may be or may not be selected, as necessary.

Meanwhile, the plasma decomposition reaction part 101 may use nitrogen gas ($N_2$) as an electric discharge gas. In this case, the thermal decomposition reaction part 108 produces solid carbon and hydrogen ($H_2$) by decomposing water and hydrocarbon by further supplying hydrogen or hydrocarbon (HC) such as methane to the additional supply port 701.

For example, the plasma decomposition reaction part 101 includes a housing 10, a high-voltage electrode 20, an electric discharge gas supply port 30, a water supply part 40, and an expanded part 52. The housing 10 has an electric discharge space DV therein and includes a narrowed part 12, a connection part 13, and a discharge port 11 that is a narrowed passageway disposed at an end of the connection part 13. The expanded part 52 is connected to the discharge port 11 and connected to an extension part 70 of the thermal decomposition reaction part 108 in a state in which a passageway of the expanded part 52 is widened. The expanded part 52 allows solid carbon, which is produced in the electric discharge space DV, to flow downward to the extension part 70 together with the supplied water.

The thermal decomposition reaction part 108 is connected to the expanded part 52 by means of the extension part 70 so as to be connected to the expanded part 52 of the plasma decomposition reaction part 101. The narrowed part 12, the connection part 13, the expanded part 52, and the extension part 70 stabilize plasma arc PA during plasma electric discharge.

The synthetic catalyst part 102 is connected to the thermal decomposition reaction part 108 and configured to produce ammonia ($NH_3$) by synthesizing separated hydrogen ($H_2$) and nitrogen monoxide (NO). For example, the synthetic catalyst part 102 is connected to a catalyst part discharge port 711 provided on the extension part 70. The synthetic catalyst part 102 is configured to produce ammonia ($NH_3$) by using the catalyst reaction that produces ammonia ($NH_3$) by using hydrogen ($H_2$) and nitrogen monoxide (NO) from the product made by the electric discharge of water performed by using electric discharge gas including hydrocarbon gas and nitrogen gas. For example, the synthetic catalyst part 102 may have a structure in which a synthetic catalyst 54 is embedded.

In case that the electric discharge of water performed by using the electric discharge gas including hydrocarbon gas and nitrogen gas is used, hydrogen ($H_2$) and nitrogen monoxide (NO) may be obtained by immediate electric discharge, and the production amount may be flexibly controlled in accordance with the amount of supply of electric power. Therefore, it is possible to produce hydrogen ($H_2$) and nitrogen monoxide (NO) stream by freely coping with discontinuous fluctuation in surplus supply load of electricity of new renewable energy. In case that the process is used, it is possible to produce ammonia with process costs approximate to process costs of the Haber-Bosch process in the related art.

In the apparatus 1 for producing ammonia by using electric discharge of water according to the first embodiment, the plasma decomposition reaction part 101 may use gas, which includes a tiny amount of nitrogen and hydrocarbon gas such as methane, as the electric discharge gas. When the plasma electric discharge is performed by using the electric discharge gas, it is possible to obtain solid carbon and hydrogen ($H_2$) during the process of decomposing hydrocarbon. In this case, solid carbon is also produced during the process of producing ammonia ($NH_3$). Further, in case that solid carbon is used, costs required to produce ammonia may be greatly reduced.

In the plasma decomposition reaction part 101, the housing 10 is electrically grounded. The high-voltage electrode 20 is mounted at one side of the housing 10, connected to high voltage HV, and configured to generate the plasma electric discharge in the electric discharge space DV. The electric discharge gas supply port 30 supplies electric discharge gas including hydrocarbon gas and nitrogen gas ($N_2$) to one side of the high-voltage electrode 20.

The water supply part 40 may include a water spray nozzle configured to spray water. Alternatively, the water supply part 40 may include a steam supply port configured to supply steam. For example, the water spray nozzle sprays (WSP1) water into nitrogen gas plasma at a front side of the high-voltage electrode 20 (a front side based on a flow direction of nitrogen gas or plasma arc PA) to produce hydrogen ($H_2$) and oxygen ($O_2$) by decomposing water by using high-temperature nitrogen gas plasma, produce nitrogen monoxide (NO) and nitrogen dioxide ($NO_2$) by allowing oxygen ($O_2$) to react with nitrogen ($N_2$), and discharge hydrogen ($H_2$) and nitrogen monoxide (NO) to the discharge port 11.

The water supply part 40, i.e., the water spray nozzle is installed on the housing 10 at a middle portion based on a longitudinal direction of the electric discharge space DV (the flow direction of nitrogen gas or plasma arc PA) and supplies (sprays) (WSP1) water into plasma arc PA during the plasma electric discharge. Because the housing 10 is grounded, water supplied (sprayed) (WSP1) from the water supply part 40, i.e., the water spray nozzle is grounded.

When water is supplied to the plasma electric discharge space DV in which hydrocarbon gas and nitrogen gas ($N_2$) are used as the electric discharge gas, hydrogen ($H_2$) and oxygen ($O_2$) are produced by vaporizing or decomposing a part or the entirety of water supplied (sprayed) (WSP1) in accordance with the amount of electric power at high voltage HV supplied to generate nitrogen gas plasma. As described above, arc electric discharge of nitrogen gas plasma may decompose water.

$$H_20 \longrightarrow H_2 + ½O_2$$

Figure 2:
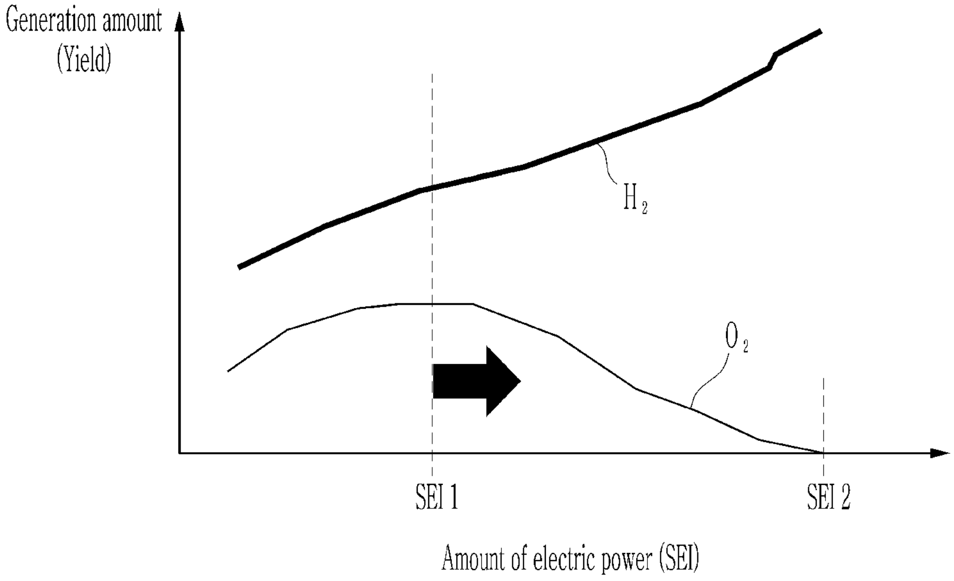
FIG. 2 is a graph illustrating a relationship between the amount of generation of hydrogen and the amount of generation of oxygen according to a condition of the amount of electric power in a plasma decomposition reaction part in FIG. 1.

FIG. 2 is a graph illustrating a relationship between the amount of generation of hydrogen and the amount of generation of oxygen according to a condition of the amount of electric power in the plasma decomposition reaction part in FIG. 1. Referring to FIG. 2, the plasma decomposition reaction part 101 implements a relationship between a condition of the amount of electric power applied to the high-voltage electrode 20 and the amount of generation (yield) of hydrogen and oxygen.

In this case, the amount of production of hydrogen and oxygen decomposed from the supplied (sprayed) (WSP1) water increases as the amount of electric power SEI increases to particular energy, i.e., a first amount of electric power SEI1 in accordance with a condition of the amount of electric power SEI supplied to the high-voltage electrode 20 to generate the nitrogen gas plasma. When electric power equal to or larger in amount than the first amount of electric power SEI1 is supplied, a combination of nitrogen and oxygen increases, such that nitrogen monoxide (NO) and nitrogen dioxide ($NO_2$) are produced by a reaction between nitrogen and oxygen.

The amount of oxygen ($O_2$), which is produced by decomposing supplied (sprayed) (WSP1) water and combined with nitrogen ($N_2$), increases as the amount of electric power SEI increases from the first amount of electric power SEI1 to a second amount of electric power SEI2, such that the amount of discharged oxygen ($O_2$) gradually decreases, and oxygen ($O_2$) is completely exhausted. In this case, the plasma decomposition reaction part 101 may mainly discharge hydrogen ($H_2$) and nitrogen monoxide (NO), such that nitrogen dioxide ($NO_2$), which is relatively smaller in amount than nitrogen monoxide (NO), may be produced.

As described above, when water is decomposed by nitrogen gas plasma, main components of a product are hydrogen ($H_2$) and nitrogen monoxide (NO), and oxygen ($O_2$) naturally disappears. The exhaust gas, which includes hydrogen ($H_2$) and nitrogen monoxide (NO) as the main components, is transferred from the plasma decomposition reaction part 101 to the thermal decomposition reaction part 108 and the synthetic catalyst 54 and synthesized, thereby producing ammonia.

The exhaust gas, which includes hydrogen ($H_2$) and nitrogen monoxide (NO), is heated by nitrogen gas plasma and then discharged, such that a temperature of the exhaust gas may be adjusted to a temperature required for the synthetic catalyst 54. That is, a gas product, which includes nitrogen monoxide (NO) and hydrogen ($H_2$) as the main components without oxygen ($O_2$), may be obtained by the nitrogen gas plasma electric discharge.

Meanwhile, the plasma decomposition reaction part 101 and the thermal decomposition reaction part 108 produce solid carbon and hydrogen ($H_2$) during the process of decomposing hydrocarbon. The apparatus 1 for producing ammonia by using electric discharge of water further includes a recovery tub 60. The recovery tub 60 is provided below the thermal decomposition reaction part 108, stores the supplied water and solid carbon between the solid carbon and hydrogen ($H_2$) produced in the plasma decomposition reaction part 101 and the thermal decomposition reaction part 108, and discharges the solid carbon to a carbon discharge port 50.

The carbon discharge port 50 is provided below the electric discharge space DV of the housing 10 and discharges the supplied water and the solid carbon between the solid carbon and hydrogen ($H_2$) produced in the electric discharge space DV, thereby obtaining carbon during the process of producing ammonia. In this case, water, which is not vaporized from the supplied (sprayed) (WSP1) water, is attached to solid carbon and guide the solid carbon to the carbon discharge port 50.

The exhaust gas including nitrogen monoxide (NO), nitrogen dioxide ($NO_2$), and hydrogen ($H_2$) is discharged from the plasma decomposition reaction part 101 and the thermal decomposition reaction part 108 to the carbon discharge port 50. In this case, the residue, which is not decomposed in the plasma decomposition reaction part 101, together with the supplied water, performs a cooling operation while moving downward to the recovery tub 60 along walls of the connection part 13, the discharge port 11, the expanded part 52, and the extension part 70 of the thermal decomposition reaction part 108. The cooling operation thermally controls the exhaust gas, which is to be discharged to the discharge port 711 of the extension part 70, to a temperature more suitable for the catalyst reaction.

Meanwhile, because a considerable amount of electric power is supplied from the plasma decomposition reaction part 101, a high-temperature reaction region, which is an arc region in which water is decomposed, is formed to be significantly wide at a downstream side thereof as well as the electric discharge space DV. Because the high-temperature reaction region formed at the downstream side is formed in the extension part 70 of the thermal decomposition reaction part 108, water may be decomposed, and hydrogen may be produced even though hydrogen or hydrocarbon such as methane is supplied to the additional supply port 701 after the arc region. In case that hydrocarbon is supplied after the arc region as described above, it is possible to prevent a likelihood of instability of the electric discharge caused by the generation of solid carbon.

In addition, when solid carbon is generated by thermal decomposition of hydrocarbon in the extension part 70 of the thermal decomposition reaction part 108, an additional decomposition reaction of unreacted water is generated by thermal radiation of carbon, thereby improving a yield of hydrogen. The improvement of the yield of the hydrogen improves a yield of synthesis of ammonia.

The synthetic catalyst part 102 is connected to the discharge port 711 provided at a lower end of the extension part 70, synthesizes hydrogen ($H_2$) and nitrogen monoxide (NO), which are thermally controlled and discharged, into ammonia ($NH_3$) by using the synthetic catalyst 54, and recovers the ammonia ($NH_3$).

Figure 3:
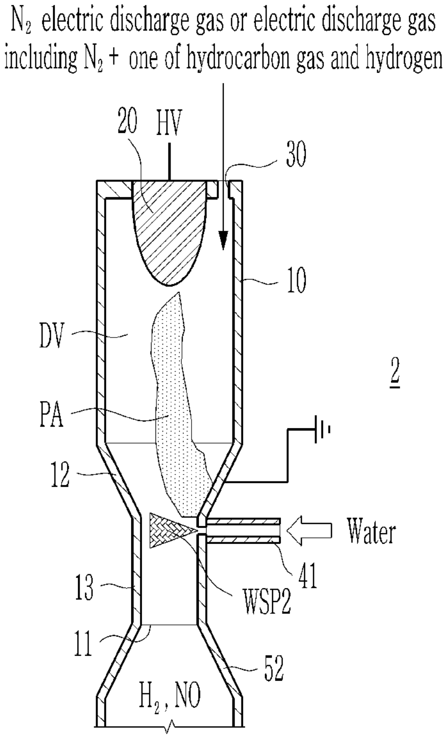
FIG. 3 is a configuration view of a plasma decomposition reaction part applied to an apparatus for producing ammonia by using electric discharge of water according to a second embodiment of the present invention.

FIG. 3 is a configuration view of a plasma decomposition reaction part applied to an apparatus for producing ammonia by using electric discharge of water according to a second embodiment of the present invention. Referring to FIG. 3, a plasma decomposition reaction part 2 applied to the apparatus for producing ammonia by using electric discharge of water according to the second embodiment includes the housing 10, the high-voltage electrode 20, the electric discharge gas supply port 30, a water supply part 41, and the expanded part 52. The housing 10 further includes: the narrowed part 12 having the passageway that is narrowed in the electric discharge space DV; and the connection part 13 connected to the narrowed part 12 and having the discharge port 11 at an end thereof. The expanded part 52 is connected to the discharge port 11 and connected to the extension part 70 of the thermal decomposition reaction part 108 in a state in which the passageway of the expanded part 52 is widened. The expanded part 52 allows solid carbon, which is produced in the electric discharge space DV, to flow downward to the extension part 70 together with the supplied water.

The water supply part 41 supplies (e.g., sprays) (WSP2) water into nitrogen gas plasma at the front side of the electric discharge space DV to produce hydrogen ($H_2$) and oxygen ($O_2$) by decomposing water by using nitrogen gas plasma, produce nitrogen monoxide (NO) and nitrogen dioxide ($NO_2$) by allowing oxygen ($O_2$) to react with nitrogen ($N_2$), and discharge hydrogen ($H_2$) and nitrogen monoxide (NO) to the discharge port 11. The water supply part 41 is installed in the connection part 13 at the end of the narrowed part 12 and supplies (e.g., sprays) (WSP2) water to the end of the plasma arc PA of the plasma electric discharge.

The water supply part 41 may concentratedly supply (spray) (WSP2) water to the end of the plasma arc PA from the connection part 13 having a narrowed passageway in comparison with the structure of the first embodiment in which the water supply part 41 supplies (sprays (WSP1) water to the electric discharge space DV.

When water, which is supplied (sprayed) (WSP2) from the front side of the plasma electric discharge space DV in which nitrogen gas is used as the electric discharge gas, is supplied, a part or the entirety of water is vaporized or decomposed in accordance with the amount of electric power SEI with high-voltages HV supplied to generate plasma, such that hydrogen ($H_2$) and oxygen ($O_2$) are produced. The water supply part 41 installed in the connection part 13 having a narrow passageway may more concentratedly supply (spray) (WSP2) water into the connection part 13 so that the water may be decomposed.

As described above, the supplied (sprayed) (WSP2) water may be decomposed by using the electric discharge of the plasma arc PA of the nitrogen gas plasma. In this case, the amount of production of hydrogen ($H_2$) and oxygen ($O_2$), which are decomposed from water, varies depending on a condition of the amount of electric power SEI supplied to the high-voltage electrode 20 to generate the nitrogen gas plasma.

Meanwhile, the plasma decomposition reaction part 2 and the thermal decomposition reaction part 108 produce solid carbon and hydrogen ($H_2$) during the process of decomposing hydrocarbon, store the supplied water and solid carbon between the produced solid carbon and hydrogen ($H_2$), and discharge the solid carbon to the carbon discharge port 50.

Figure 4:
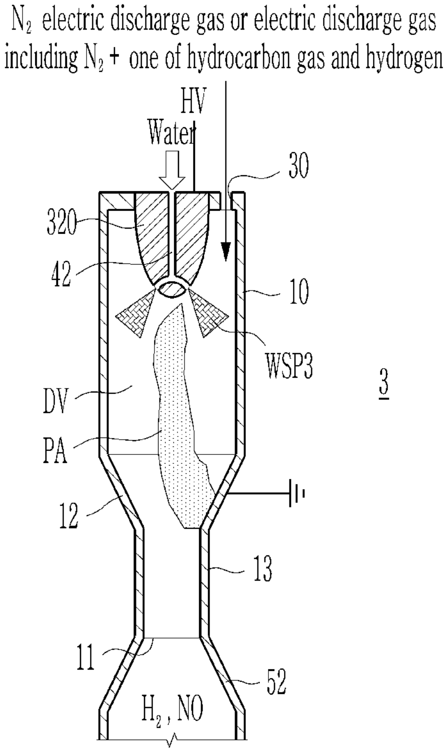
FIG. 4 is a configuration view of a plasma decomposition reaction part applied to an apparatus for producing ammonia by using electric discharge of water according to a third embodiment of the present invention.

FIG. 4 is a configuration view of a plasma decomposition reaction part applied to an apparatus for producing ammonia by using electric discharge of water according to a third embodiment of the present invention. Referring to FIG. 4, a plasma decomposition reaction part 3 applied to the apparatus for producing ammonia by using electric discharge of water according to the third embodiment includes the housing 10, a high-voltage electrode 320, the electric discharge gas supply port 30, a water supply part 42, and the expanded part 52. The housing 10 further includes: the narrowed part 12 having the passageway that is narrowed in the electric discharge space DV; and the connection part 13 connected to the narrowed part 12 and having the discharge port 11 having a narrowed passageway at an end thereof. The expanded part 52 is connected to the discharge port 11 and connected to the extension part 70 of the thermal decomposition reaction part 108 in a state in which the passageway of the expanded part 52 is widened. The expanded part 52 allows solid carbon, which is produced in the electric discharge space DV, to flow downward to the extension part 70 together with the supplied water.

The water supply part 42 is provided in the high-voltage electrode 320 and supplies (sprays) (WSP3) water to an outer periphery of the plasma arc PA of the nitrogen gas plasma electric discharge. The water supply part 42 supplies (sprays) (WSP3) water from the high-voltage electrode 320 to the nitrogen gas plasma at front and lateral sides of the high-voltage electrode 320 to produce hydrogen ($H_2$) and oxygen ($O_2$) decomposing water by using nitrogen gas plasma, produce nitrogen monoxide (NO) and nitrogen dioxide ($NO_2$) by allowing oxygen ($O_2$) to react with nitrogen ($N_2$), and discharge hydrogen ($H_2$) and nitrogen monoxide (NO) to the discharge port 11.

The water supply part 42 is installed at a center of the high-voltage electrode 320 and configured to supply (spray) (WSP3) water to the outer periphery of the plasma arc PA of the nitrogen gas plasma electric discharge. The water supply part 42 is provided at the center of the high-voltage electrode 320 and formed in the longitudinal direction. The water supply part 42 may be provided as a plurality of water supply parts 42 that branches toward the front and lateral sides of the high-voltage electrode 320. Therefore, the water supplied (sprayed) (WSP3) from the water supply part 42 may define a three-dimensional structure that surrounds the front and lateral sides of the high-voltage electrode 320.

Meanwhile, the water supply part 42 may include the water spray nozzle, and a tip of the water spray nozzle may be positioned to be inserted into the high-voltage electrode 320. That is, an outer surface of the high-voltage electrode 320 further protrudes than the tip of the water spray nozzle, such that it is possible to prevent the plasma arc from being produced by the tip of the water spray nozzle (prevent the water spray nozzle from being damaged).

When water is supplied to the electric discharge space DV of the nitrogen gas plasma that uses nitrogen gas as the electric discharge gas, a part or the entirety of water, which is sprayed (WSP3) in accordance with the amount of electric power SEI at the high voltage HV supplied to generate the nitrogen gas plasma, is vaporized or decomposed, such that hydrogen ($H_2$) and oxygen ($O_2$) are produced. As described above, the electric discharge of the plasma arc PA of the nitrogen gas plasma may be used to decompose water.

Meanwhile, the plasma decomposition reaction part 3 and the thermal decomposition reaction part 108 produce solid carbon and hydrogen ($H_2$) during the process of decomposing hydrocarbon, store the supplied water and solid carbon between the produced solid carbon and hydrogen ($H_2$), and discharge the solid carbon to the carbon discharge port 50.

Figure 5:
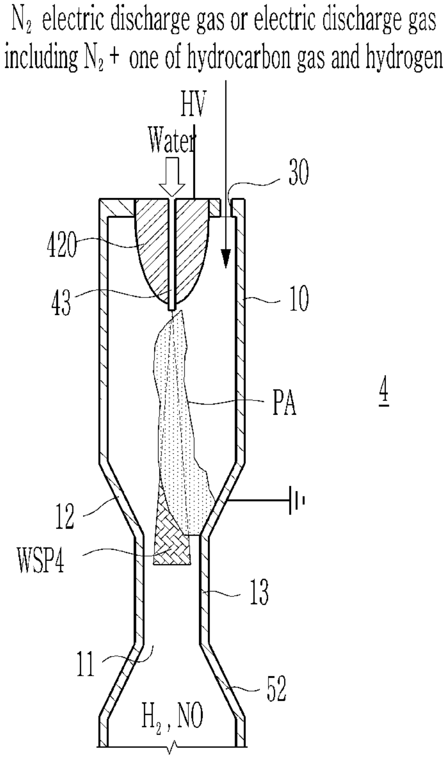
FIG. 5 is a configuration view of a plasma decomposition reaction part applied to an apparatus for producing ammonia by using electric discharge of water according to a fourth embodiment of the present invention.

FIG. 5 is a configuration view of a plasma decomposition reaction part applied to an apparatus for producing ammonia by using electric discharge of water according to a fourth embodiment of the present invention. Referring to FIG. 5, a plasma decomposition reaction part 4 applied to the apparatus for producing ammonia by using electric discharge of water according to the fourth embodiment includes the housing 10, a high-voltage electrode 420, the electric discharge gas supply port 30, a water supply part 43, and the expanded part 52. The housing 10 further includes: the narrowed part 12 having the passageway that is narrowed in the electric discharge space DV; and the connection part 13 connected to the narrowed part 12 and having the discharge port 11 having the narrowed passageway at an end thereof. The expanded part 52 is connected to the discharge port 11 and connected to the extension part 70 of the thermal decomposition reaction part 108 in a state in which the passageway of the expanded part 52 is widened. The expanded part 52 allows solid carbon, which is produced in the electric discharge space DV, to flow downward to the extension part 70 together with the supplied water.

The water supply part 43 is provided in the high-voltage electrode 420 and supplies (sprays) (WSP4) water to a front side of the plasma arc PA of the nitrogen gas plasma electric discharge. The water supply part 43 supplies (sprays) (WSP4) water from the high-voltage electrode 420 to the nitrogen gas plasma at a front side of the high-voltage electrode 420 to produce hydrogen ($H_2$) and oxygen ($O_2$) by decomposing water by using nitrogen gas plasma, produce nitrogen monoxide (NO) and nitrogen dioxide ($NO_2$) by allowing oxygen ($O_2$) to react with nitrogen ($N_2$), and discharge hydrogen ($H_2$) and nitrogen monoxide (NO) to the discharge port 11. The discharge port 11 has a converging-diverging structure and sprays water to plasma and nitrogen gas plasma so that the produced product is cooled while being discharged through the discharge port 11.

The water supply part 43 is installed at a center of the high-voltage electrode 420 and configured to supply (spray) (WSP4) water to the front side of the plasma arc PA of the nitrogen gas plasma electric discharge. The water supply part 43 is provided at the center of the high-voltage electrode 420 and formed in the longitudinal direction. The water supply part 43 may be provided to be directed toward the front side of the high-voltage electrode 420. Therefore, the water supplied (sprayed) (WSP4) from the water supply part 43 may define a three-dimensional structure that extends to the front side of the high-voltage electrode 420.

Meanwhile, the water supply part 42 may include the water spray nozzle, and a tip of the water spray nozzle may be positioned to be inserted into the high-voltage electrode 320. That is, an outer surface of the high-voltage electrode 320 further protrudes than the tip of the water spray nozzle, such that it is possible to prevent the plasma arc from being produced by the tip of the water spray nozzle (prevent the water spray nozzle from being damaged).

When water is supplied to the electric discharge space DV of the nitrogen gas plasma that uses nitrogen gas as the electric discharge gas, a part or the entirety of water, which is supplied (sprayed) (WSP4) in accordance with the amount of electric power SEI at the high voltage HV supplied to generate the nitrogen gas plasma, is vaporized or decomposed, such that hydrogen ($H_2$) and oxygen ($O_2$) are produced. As described above, the electric discharge of the plasma arc PA may be used to decompose water.

Meanwhile, the plasma decomposition reaction part 4 and the thermal decomposition reaction part 108 produce solid carbon and hydrogen ($H_2$) during the process of decomposing hydrocarbon, store the supplied water and solid carbon between the produced solid carbon and hydrogen ($H_2$), and discharge the solid carbon to the carbon discharge port 50.

Figure 6:
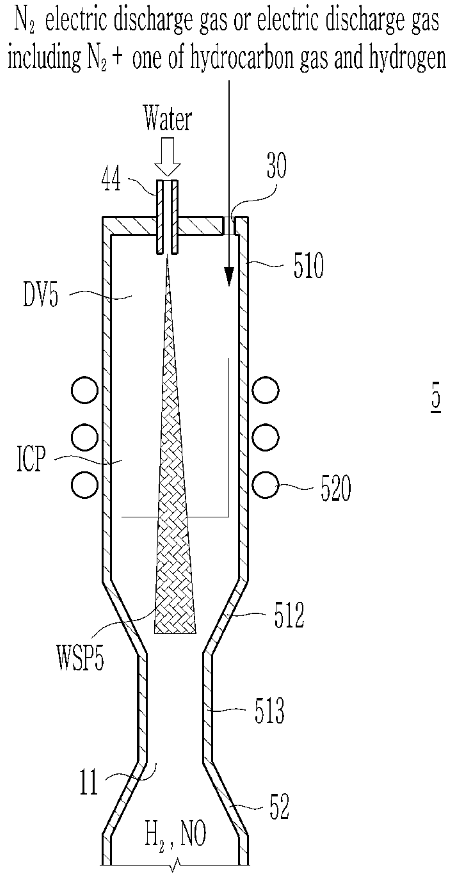
FIG. 6 is a configuration view of a plasma decomposition reaction part applied to an apparatus for producing ammonia by using electric discharge of water according to a fifth embodiment of the present invention.

FIG. 6 is a configuration view of a plasma decomposition reaction part applied to an apparatus for producing ammonia by using electric discharge of water according to a fifth embodiment of the present invention. Referring to FIG. 6, a plasma decomposition reaction part 5 applied to the apparatus for producing ammonia by using electric discharge of water according to the fifth embodiment includes an induced-coupled dielectric tube 510, an electric discharge coil 520, the electric discharge gas supply port 30, a water supply part 44, and the expanded part 52. The induced-coupled dielectric tube 510 further includes: a narrowed part 512 having a passageway that is narrowed in an electric discharge space DV5; and a connection part 513 connected to the narrowed part 512 and having the discharge port 11 having the narrowed passageway at an end thereof. The expanded part 52 is connected to the discharge port 11 and connected to the extension part 70 of the thermal decomposition reaction part 108 in a state in which the passageway of the expanded part 52 is widened. The expanded part 52 allows solid carbon, which is produced in the electric discharge space DV5, to flow downward to the extension part 70 together with the supplied water.

For example, the induced-coupled dielectric tube 510 has the electric discharge space DV5 therein and has the discharge port 11 at an end thereof. The electric discharge coil 520 is provided at an outer periphery of the induced-coupled dielectric tube 510 and generates induced coupled plasma electric discharge in the electric discharge space DV5. The electric discharge gas supply port 30 supplies electric discharge gas including hydrocarbon gas and nitrogen gas ($N_2$) to one side of the induced-coupled dielectric tube 510.

The water supply part 44 may include a water spray nozzle configured to spray water. Alternatively, the water supply part 44 may include a steam supply port configured to supply steam. The water supply part 44 produces hydrogen ($H_2$) and oxygen ($O_2$) from water by supplying (spraying) (WSP5) water to nitrogen gas induced coupled plasma (ICP) in the electric discharge space, produces nitrogen monoxide (NO) by allowing oxygen ($O_2$) to react with nitrogen ($N_2$), and discharges hydrogen ($H_2$) and nitrogen monoxide (NO) to the discharge port 11.

The water supply part 44 is provided at one side based on a longitudinal direction of the induced-coupled dielectric tube 510 (a flow direction of nitrogen gas and induced coupled plasma) and supplies (sprays) (WSP5) water to the induced coupled plasma (ICP) in the electric discharge space DV5.

When water is supplied to the plasma electric discharge space DV5 in which nitrogen gas is used as the electric discharge gas, a part or the entirety of water, which is supplied (sprayed) (WSP5) in accordance with the amount of electric power SEI supplied to generate the induced coupled plasma (ICP), is vaporized or decomposed, such that hydrogen ($H_2$) and oxygen ($O_2$) are produced. As described above, the induced coupled plasma electric discharge may be used to decompose water.

In this case, the amount of production of hydrogen ($H_2$) and oxygen ($O_2$), which are decomposed from water supplied (sprayed) (WSP5) increases as the amount of electric power increases to particular energy, i.e., the first amount of electric power SEI1 in accordance with a condition of the amount of electric power SEI supplied to the electric discharge coil 520 to generate the induced coupled plasma (ICP). When electric power equal to or larger in amount than the first amount of electric power SEI1 is supplied, a combination of nitrogen ($N_2$) and oxygen ($O_2$) increases, such that nitrogen monoxide (NO) and nitrogen dioxide ($NO_2$) are produced by a reaction between nitrogen ($N_2$) and oxygen ($O_2$).

The amount of oxygen ($O_2$), which is produced by decomposing supplied (sprayed) (WSP5) water and combined with nitrogen ($N_2$), increases as the amount of used electric power increases from the first amount of electric power SEI1 to a second amount of electric power SEI2, such that the amount of discharged oxygen ($O_2$) gradually decreases, and oxygen ($O_2$) is completely exhausted. The plasma decomposition reaction part 5 may mainly discharge hydrogen ($H_2$) and nitrogen monoxide (NO), such that nitrogen dioxide ($NO_2$), which is relatively small in amount than nitrogen monoxide (NO), may be produced.

As described above, when water is decomposed by the nitrogen gas induced coupled plasma (ICP), main components of a product are hydrogen ($H_2$) and nitrogen monoxide (NO), and oxygen naturally disappears. The exhaust gas, which includes hydrogen ($H_2$) and nitrogen monoxide (NO) as the main components, is transferred to the synthetic catalyst and synthesized at the time of constituting the apparatus for producing ammonia by using electric discharge of water, thereby producing ammonia.

Meanwhile, the plasma decomposition reaction part 5 and the thermal decomposition reaction part 108 produce solid carbon and hydrogen ($H_2$) during the process of decomposing hydrocarbon, store the supplied water and solid carbon between the produced solid carbon and hydrogen ($H_2$), and discharge the solid carbon to the carbon discharge port 50.

Figure 7:
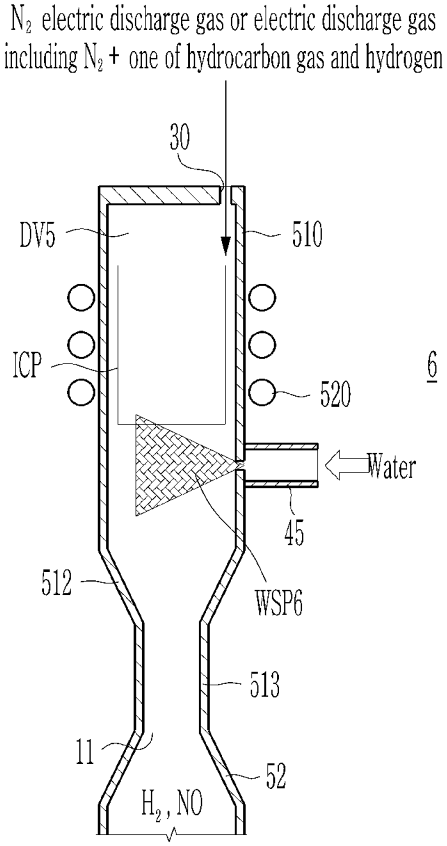
FIG. 7 is a configuration view of a plasma decomposition reaction part applied to an apparatus for producing ammonia by using electric discharge of water according to a sixth embodiment of the present invention.

FIG. 7 is a configuration view of a plasma decomposition reaction part applied to an apparatus for producing ammonia by using electric discharge of water according to a sixth embodiment of the present invention. Referring to FIG. 7, a plasma decomposition reaction part 6 applied to the apparatus for producing ammonia by using electric discharge of water according to the sixth embodiment includes the induced-coupled dielectric tube 510, the electric discharge coil 520, the electric discharge gas supply port 30, a water supply part 45, and the expanded part 52.

The water supply part 45 is provided at a front side of the electric discharge coil 520 based on the longitudinal direction of the induced-coupled dielectric tube 510 and supplies (sprays) (WSP6) water to the front side of the induced coupled plasma in the electric discharge space DV5.

The water supply part 45 supplies (e.g., sprays) (WSP6) water into the nitrogen gas induced coupled plasma (ICP) at the front side of the electric discharge space DV5 to produce hydrogen ($H_2$) and oxygen ($O_2$) by decomposing water by using the nitrogen gas induced coupled plasma (ICP), produce nitrogen monoxide (NO) and nitrogen dioxide ($NO_2$) by allowing oxygen ($O_2$) to react with nitrogen ($N_2$), and discharge hydrogen ($H_2$) and nitrogen monoxide (NO) to the discharge port 11.

The water supply part 45 concentratedly supplies (sprays) (WSP6) to the end of the induced coupled plasma (ICP) of the induced coupled plasma electric discharge. The water supply part 45 may concentratedly supply (spray) (WSP6) water to the end of the induced coupled plasma (ICP) at the front side in comparison with the structure of the fifth embodiment in which the water supply part 44 supplies (sprays) (WSP5) water to the electric discharge space DV5.

When water, which is supplied (sprayed) (WSP6) from the front side of the plasma electric discharge space DV5 in which nitrogen gas is used as the electric discharge gas, is supplied, a part or the entirety of water is vaporized or decomposed in accordance with the amount of electric power SEI supplied to generate the induced coupled plasma (ICP), such that hydrogen ($H_2$) and oxygen ($O_2$) are produced. The water supply part 44 installed at the front side may decompose water by more concentratedly supplying (spraying) (WSP6) water to the induced coupled plasma (ICP).

As described above, the supplied (sprayed) (WSP6) water may be decomposed by the induced coupled plasma electric discharge. In this case, the amount of production of hydrogen and oxygen, which are decomposed from water, varies depending on a condition of the amount of electric power SEI supplied to the electric discharge coil 520 to generate the induced coupled plasma.

Meanwhile, the plasma decomposition reaction part 6 and the thermal decomposition reaction part 108 produce solid carbon and hydrogen ($H_2$) during the process of decomposing hydrocarbon, store the supplied water and solid carbon between the produced solid carbon and hydrogen ($H_2$), and discharge the solid carbon to the carbon discharge port 50.

Figure 8:
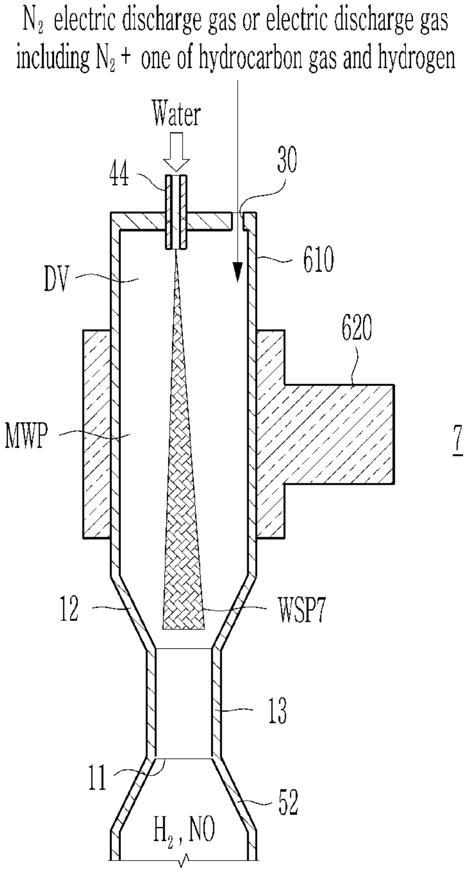
FIG. 8 is a configuration view of a plasma decomposition reaction part applied to an apparatus for producing ammonia by using electric discharge of water according to a seventh embodiment of the present invention.

FIG. 8 is a configuration view of a plasma decomposition reaction part applied to an apparatus for producing ammonia by using electric discharge of water according to a seventh embodiment of the present invention. Referring to FIG. 8, a plasma decomposition reaction part 7 applied to the apparatus for producing ammonia by using electric discharge of water according to the seventh embodiment includes a housing 610, a microwave guide 620, the electric discharge gas supply port 30, the water supply part 44, and the expanded part 52. The expanded part 52 is connected to the discharge port 11 and connected to the extension part 70 of the thermal decomposition reaction part 108 in a state in which the passageway of the expanded part 52 is widened. The expanded part 52 allows solid carbon, which is produced in the electric discharge space DV5, to flow downward to the extension part 70 together with the supplied water.

The housing 610 has the electric discharge space DV therein and has the discharge port 11 at an end thereof. The microwave guide 620 is provided outside the housing 610 and generates microwave plasma (MWP) in the electric discharge space DV. The electric discharge gas supply port 30 supplies nitrogen gas ($N_2$) to one side of the housing 610.

The water supply part 44 may include a water spray nozzle configured to spray water. Alternatively, the water supply part 44 may include a steam supply port configured to supply steam. For example, the water supply part 44 produces hydrogen ($H_2$) and oxygen ($O_2$) from water by supplying (spraying) (WSP7) water to the nitrogen gas microwave plasma (MWP) in the electric discharge space DV, produces nitrogen monoxide (NO) by allowing oxygen ($O_2$) to react with nitrogen ($N_2$), and discharges hydrogen ($H_2$) and nitrogen monoxide (NO) to the discharge port 11. The water supply part 44 is provided at one side based on a longitudinal direction of the housing 610 and supplies (sprays) (WSP7) water to the microwave plasma (MWP) in the electric discharge space DV.

When water is supplied to the electric discharge space DV in which nitrogen gas is used as the electric discharge gas, a part or the entirety of water, which is supplied (sprayed) (WSP7) in accordance with the amount of electric power supplied to generate the microwave plasma, is vaporized or decomposed, such that hydrogen ($H_2$) and oxygen ($O_2$) are produced. As described above, the microwave plasma electric discharge may be used to decompose water.

Meanwhile, the plasma decomposition reaction part 7 and the thermal decomposition reaction part 108 produce solid carbon and hydrogen ($H_2$) during the process of decomposing hydrocarbon, store the supplied water and solid carbon between the produced solid carbon and hydrogen ($H_2$), and discharge the solid carbon to the carbon discharge port 50.

Figure 9:
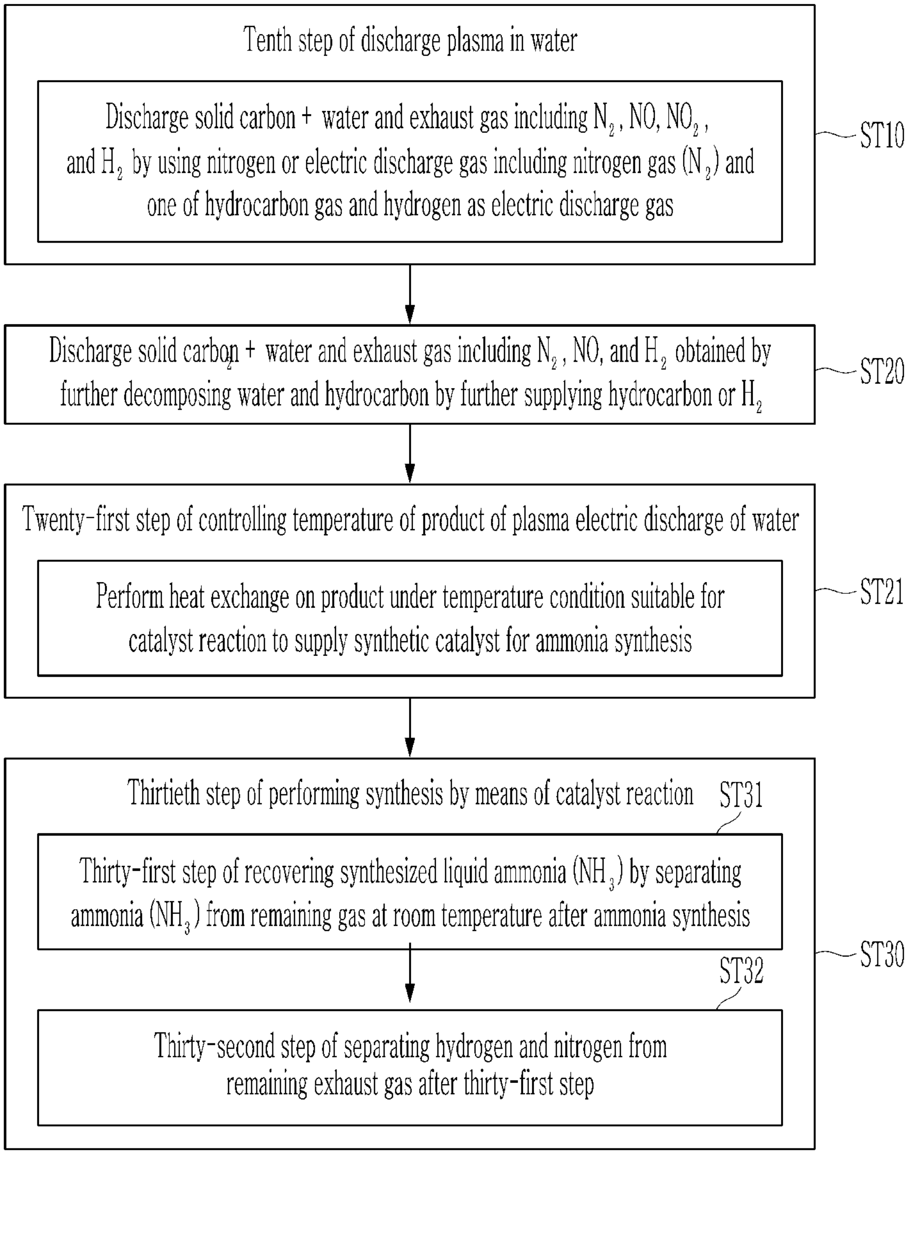
FIG. 9 is a flowchart illustrating a method of producing ammonia by using electric discharge of water according to the embodiment of the present invention.

Hereinafter, a method of producing ammonia by using electric discharge of water will be described. FIG. 9 is a flowchart illustrating a method of producing ammonia by using electric discharge of water according to the embodiment of the present invention. Referring to FIG. 9, the method of producing ammonia by using electric discharge of water according to the embodiment includes a tenth step ST10, a twentieth step ST20, and a thirtieth step ST30.

In the tenth step ST10, the electric discharge gas including nitrogen gas and any one of hydrocarbon gas and hydrogen may be used. In this case, in the twentieth step ST20, one of hydrocarbon gas and hydrogen may be or may not be further supplied. In addition, in the tenth step ST10, nitrogen gas may be used as the electric discharge gas. In this case, in the twentieth step ST20, one of hydrocarbon gas and hydrogen is supplied.

In the tenth step ST10, the plasma electric discharge of water is used by supplying water to plasma in the plasma decomposition reaction part 101. The exhaust gas including nitrogen ($N_2$), nitrogen monoxide (NO), nitrogen dioxide ($NO_2$), and hydrogen ($H_2$) is discharged to the discharge port 11 by using the electric discharge gas including nitrogen gas and any one of hydrocarbon gas and hydrogen, and solid carbon and hydrogen ($H_2$) are primarily discharged during the process of decomposing hydrocarbon. The exhaust gas is discharged from the plasma decomposition reaction part 101 to the synthetic catalyst part 102. The solid carbon and water are discharged to the water discharge port 50.

In the twentieth step ST20 after the tenth step ST10, one of hydrocarbon gas and hydrogen is further supplied, and the solid carbon and hydrogen ($H_2$), which are obtained by decomposing water and hydrocarbon, are secondarily discharged.

In addition, in the tenth step ST10, the plasma electric discharge of water may be used by supplying water to plasma in the carbon hydrogen production part 101, nitrogen gas may be used as the electric discharge gas, and the exhaust gas including nitrogen ($N_2$), nitrogen monoxide (NO), nitrogen dioxide ($NO_2$), and hydrogen ($H_2$) may be discharged to the discharge port 11. The exhaust gas is discharged from the plasma decomposition reaction part 101 to the synthetic catalyst part 102. The solid carbon and water are discharged to the water discharge port 50.

In the twentieth step ST20 after the tenth step ST10, hydrocarbon or hydrogen may be further supplied in accordance with the necessity of the amount of supply of hydrogen required for the synthetic catalyst 54, and solid carbon and hydrogen ($H_2$), which are obtained by decomposing water and hydrocarbon, may be secondarily discharged.

The twentieth step ST20 may further include a twenty-first step ST21. In the twenty-first step ST21, heat exchange is performed in a heat exchange part 103 under a temperature condition suitable for the catalyst reaction to supply the product to the synthetic catalyst 54 of the synthetic catalyst part 102 for synthesizing ammonia (see FIG. 11).

In the thirtieth step ST30, the synthetic catalyst part 102 synthesizes ammonia by supplying the exhaust gas including nitrogen ($N_2$), nitrogen monoxide (NO), nitrogen dioxide ($NO_2$), and hydrogen ($H_2$), which are products of the plasma electric discharge of water, to the discharge synthetic catalyst 54 of the synthetic catalyst part 102 and discharges the synthesized ammonia to a catalyst part discharge port 51.

The thirtieth step ST30 may further include a thirty-first step ST31 and a thirty-second step ST32. In the thirty-first step ST31, an ammonia recovery part 104 recovers synthesized liquid ammonia ($NH_3$) by separating the liquid ammonia ($NH_3$) from the remaining gas at room temperature after the ammonia synthesis (see FIG. 12). In the thirty-second step ST32 after the thirty-first step ST31, a gas separation part 105 separate hydrogen and nitrogen from the remaining exhaust gas (see FIG. 12).

The method of producing ammonia by using electric discharge of water according to the embodiment may use gas, which includes a tiny amount of nitrogen and hydrocarbon gas such as methane, as the electric discharge gas. When the plasma electric discharge is performed by using the electric discharge gas, it is possible to obtain solid carbon and hydrogen ($H_2$) during the process of decomposing hydrocarbon. In this case, solid carbon is also produced during the process of producing ammonia ($NH_3$). Further, in case that solid carbon is used, costs required to produce ammonia may be greatly reduced.

FIG. 10 is a flowchart illustrating a process of producing carbon, hydrogen, and nitrogen monoxide in the method of producing ammonia by using electric discharge of water in FIG. 9. Referring to FIG. 10, the tenth step ST10 includes a first step ST1, a second step ST2, and a third step ST3.

In the first step ST1, the gas including a tiny amount of nitrogen and hydrocarbon gas such as methane is used as the electric discharge gas, plasma is generated, supplied (sprayed) (WSP1) water is decomposed into hydrogen and oxygen with a mole fraction of 2:1 by high energy provided by the nitrogen gas plasma, and solid carbon and hydrogen ($H_2$) are produced during the process of decomposing hydrocarbon.

In the first step ST1, a plasma temperature is adjusted to warm plasma within a range of 1000 to 2000K to prevent the temperature from being excessively raised when the nitrogen gas plasma is generated during the process of decomposing water.

In the second step ST2, the overall amount of oxygen ($O_2$), which is produced during the process of decomposing water in the first step ST1, reacts with nitrogen ($N_2$), such that a gaseous product is configured by nitrogen ($N_2$), hydrogen ($H_2$), nitrogen monoxide (NO), and nitrogen dioxide ($NO_2$) that are not subjected to the reaction.

In the third step ST3 after the second step ST2, the plasma is discharged in the form of a jet through the discharge port 11 that is narrowed from a high-temperature reaction zone, such that a uniform high-temperature reaction space is defined in a water decomposition space 108.

In the third step ST3, a gas product, which includes nitrogen monoxide (NO) and hydrogen ($H_2$) as main components without oxygen ($O_2$), is discharged through the nitrogen gas plasma electric discharge, and the solid carbon is discharged together with water, such that gas product and solid carbon may be obtained. The discharge port 11 is configured as a nozzle having a converging-diverging structure.

In addition, in the third step ST3 after the second step ST2, a temperature of the plasma is quickly decreased during a process in which the plasma passes through the heat exchange part (see 103 in FIG. 11) provided in the discharge port 11 that is narrowed from the high-temperature reaction zone. Therefore, it is possible to improve selectivity of nitrogen monoxide (NO) by suppressing the oxidation reaction of nitrogen monoxide (NO) to nitrogen dioxide ($NO_2$).

Figure 11:
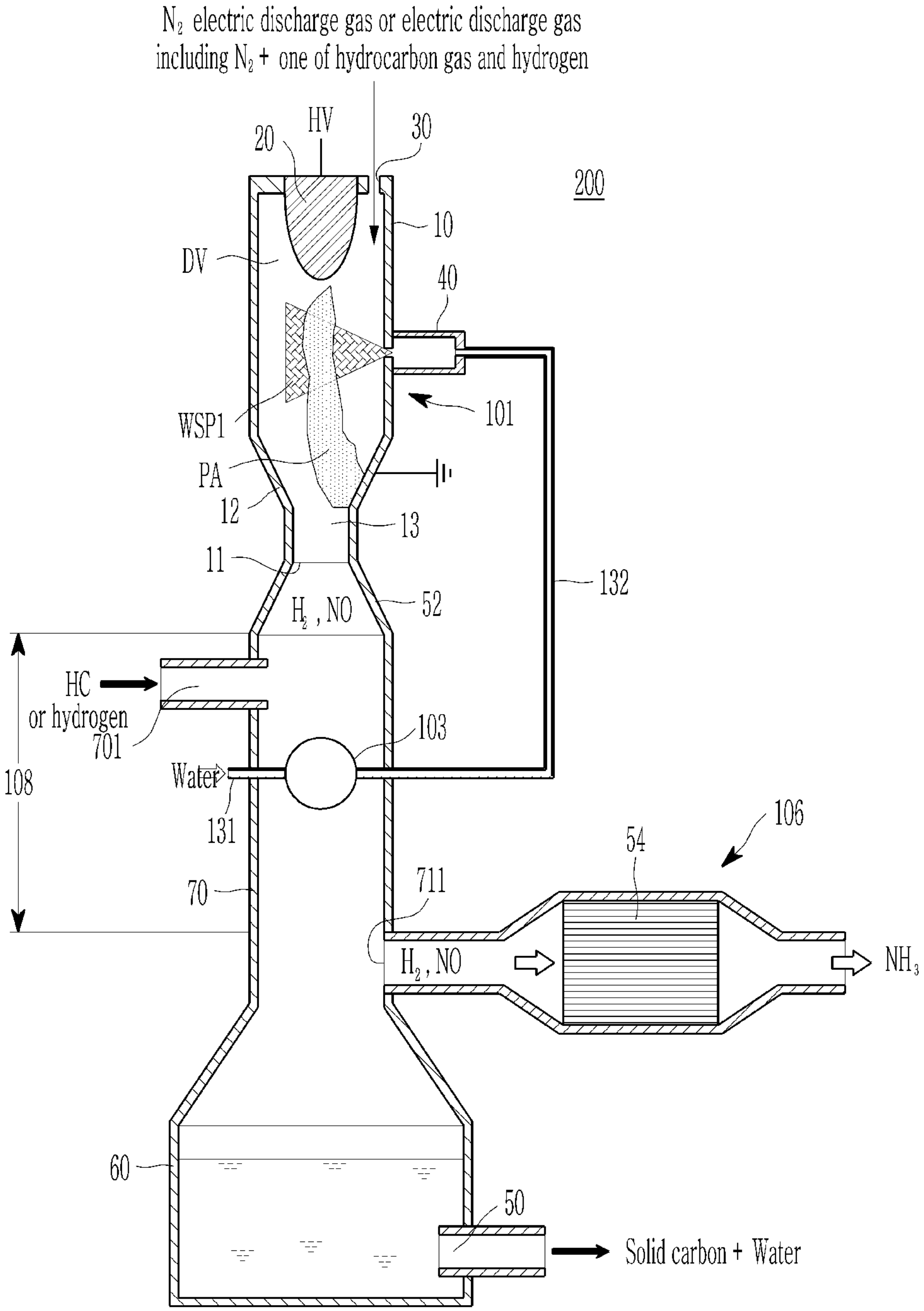
FIG. 11 is a configuration view of an apparatus for producing ammonia by using electric discharge of water according to an eighth embodiment of the present invention.

FIG. 11 is a configuration view of an apparatus for producing ammonia by using electric discharge of water according to an eighth embodiment of the present invention. Referring to FIG. 11, an apparatus 200 for producing ammonia by using electric discharge of water according to the eighth embodiment further includes the heat exchange part 103 in addition to the plasma decomposition reaction part 101 and the synthetic catalyst part 102.

The heat exchange part 103 is embedded in the thermal decomposition reaction part 108 between the plasma decomposition reaction part 101 and the synthetic catalyst part 102 and controls a temperature to a temperature suitable for the catalyst reaction of the synthetic catalyst 54 by cooling the exhaust gas including nitrogen monoxide (NO), nitrogen dioxide ($NO_2$), and hydrogen ($H_2$) discharged from the plasma decomposition reaction part 101.

The heat exchange part 103 absorbs heat of an internal space by using low-temperature water supplied through an inlet 131, and an outlet 132 of the heat exchange part 103 is connected to the water supply part 40 that supplies (sprays) water to the plasma decomposition reaction part 101. Therefore, the low-temperature water supplied to the inlet 131 absorbs heat of the internal space in the heat exchange part 103 and is supplied to the water supply part 40 through the outlet 132, and the low-temperature water is supplied (sprayed) (WSP1) to the electric discharge space DV.

That is, water is heated in the thermal decomposition reaction part 108 by using plasma heat of the exhaust gas discharged from the plasma decomposition reaction part 101 to the discharge port 11, and the heated water is heated by the temperature of the exhaust gas discharged to the discharge port 11, such that thermal control suitable for the catalyst reaction is performed.

In this case, meanwhile, the plasma decomposition reaction part 101 produces solid carbon and hydrogen ($H_2$) during the process of decomposing hydrocarbon, stores the supplied water and solid carbon between the produced solid carbon and hydrogen ($H_2$), and discharges the solid carbon to the carbon discharge port 50. The solid carbon between the solid carbon and hydrogen ($H_2$) produced in the electric discharge space DV may be discharged together with the supplied water, thereby obtaining carbon during the process of producing ammonia.

Figure 12:
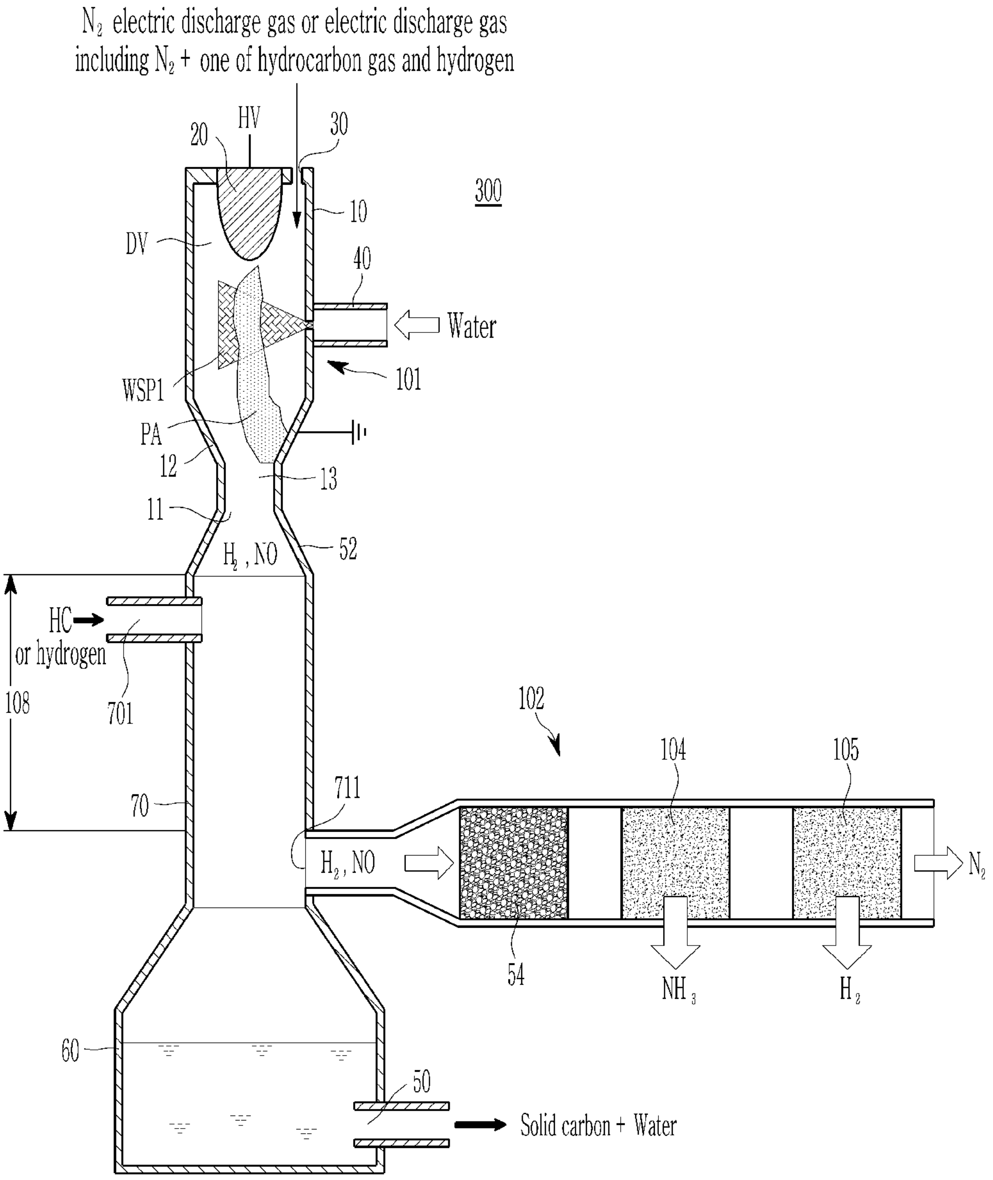
FIG. 12 is a configuration view of an apparatus for producing ammonia by using electric discharge of water according to a ninth embodiment of the present invention.

FIG. 12 is a configuration view of an apparatus for producing ammonia by using electric discharge of water according to a ninth embodiment of the present invention. Referring to FIG. 12, an apparatus 300 for producing ammonia by using electric discharge of water according to the ninth embodiment further includes the ammonia recovery part 104 and the gas separation part 105.

The ammonia recovery part 104 is disposed at the front side, i.e., the downstream side of the synthetic catalyst part 102 and configured to recover the synthesized ammonia ($NH_3$). The gas separation part 105 is configured to separate hydrogen and nitrogen from the exhaust gas having passed through the ammonia recovery part 104.

In this case, meanwhile, the plasma decomposition reaction part 101 and the thermal decomposition reaction part 108 produce solid carbon and hydrogen ($H_2$) during the process of decomposing hydrocarbon, store the supplied water and solid carbon between the produced solid carbon and hydrogen ($H_2$), and discharge the solid carbon to the carbon discharge port 50. The solid carbon between the solid carbon and hydrogen ($H_2$) produced in the electric discharge space DV may be discharged together with the supplied water, thereby obtaining carbon during the process of producing ammonia.

Figure 13:
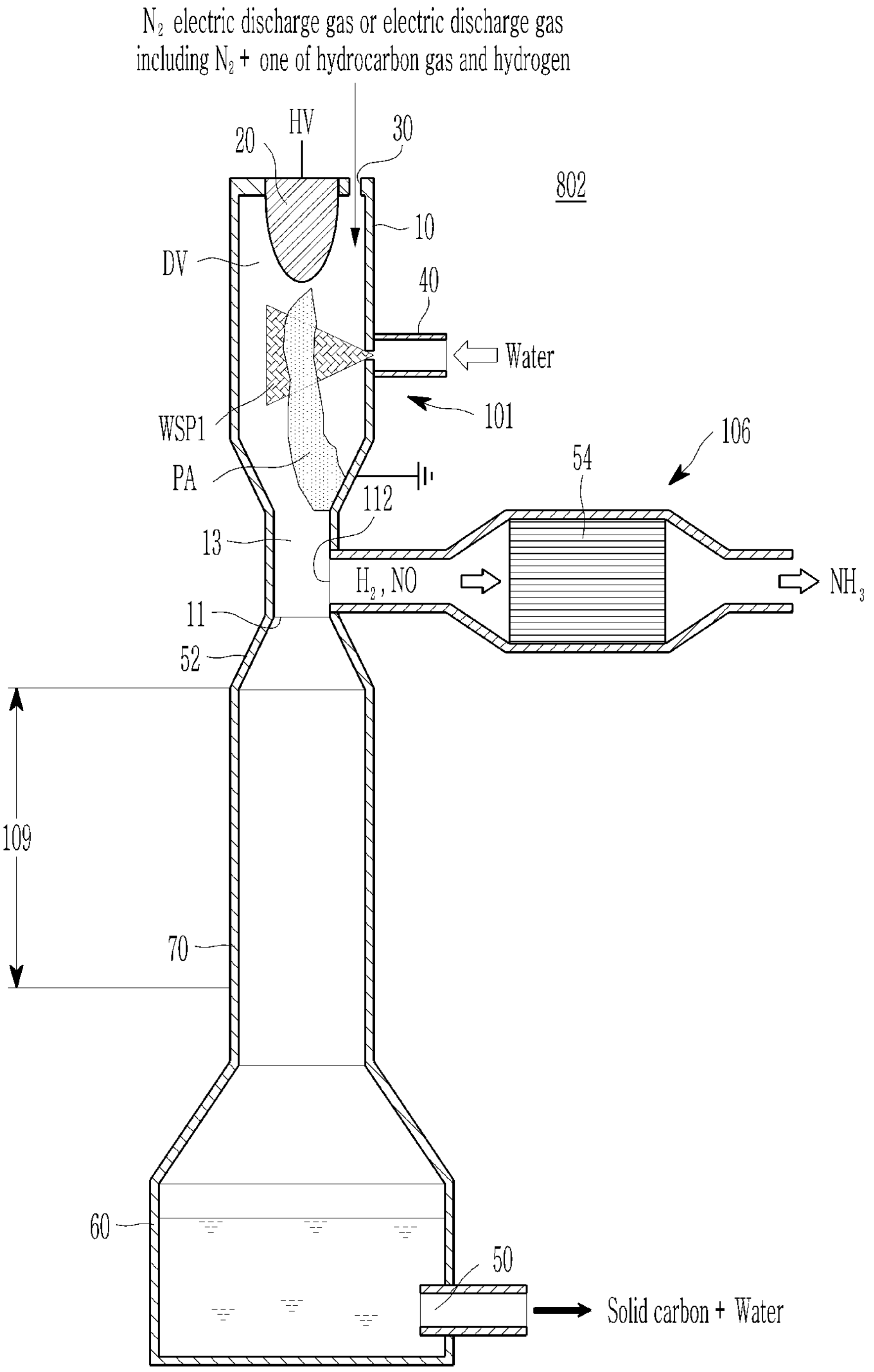
FIG. 13 is a configuration view of an apparatus for producing ammonia by using electric discharge of water according to a tenth embodiment of the present invention.

FIG. 13 is a configuration view of an apparatus for producing ammonia by using electric discharge of water according to a tenth embodiment of the present invention. Referring to FIG. 13, in an apparatus 802 for producing ammonia by using electric discharge of water according to the tenth embodiment, the synthetic catalyst part 106 is connected to the discharge port 112 provided on the connection part 13 of the plasma decomposition reaction part 101.

The synthetic catalyst part 106 is connected to the discharge port 112 provided on the connection part 13 positioned on an upper portion of a thermal decomposition reaction part 109 and recovers ammonia ($NH_3$) by synthesizing the ammonia ($NH_3$), by using the synthetic catalyst 54, from hydrogen ($H_2$) and nitrogen monoxide (NO) produced and discharged from the plasma decomposition reaction part 101.

In this state, the recovery tub 60 is connected to the extension part 70 of the thermal decomposition reaction part 109, stores the supplied water and solid carbon between the solid carbon and hydrogen ($H_2$) produced in the plasma decomposition reaction part 101 and the thermal decomposition reaction part 109, and discharges the solid carbon to the carbon discharge port 50.

Figure 14:
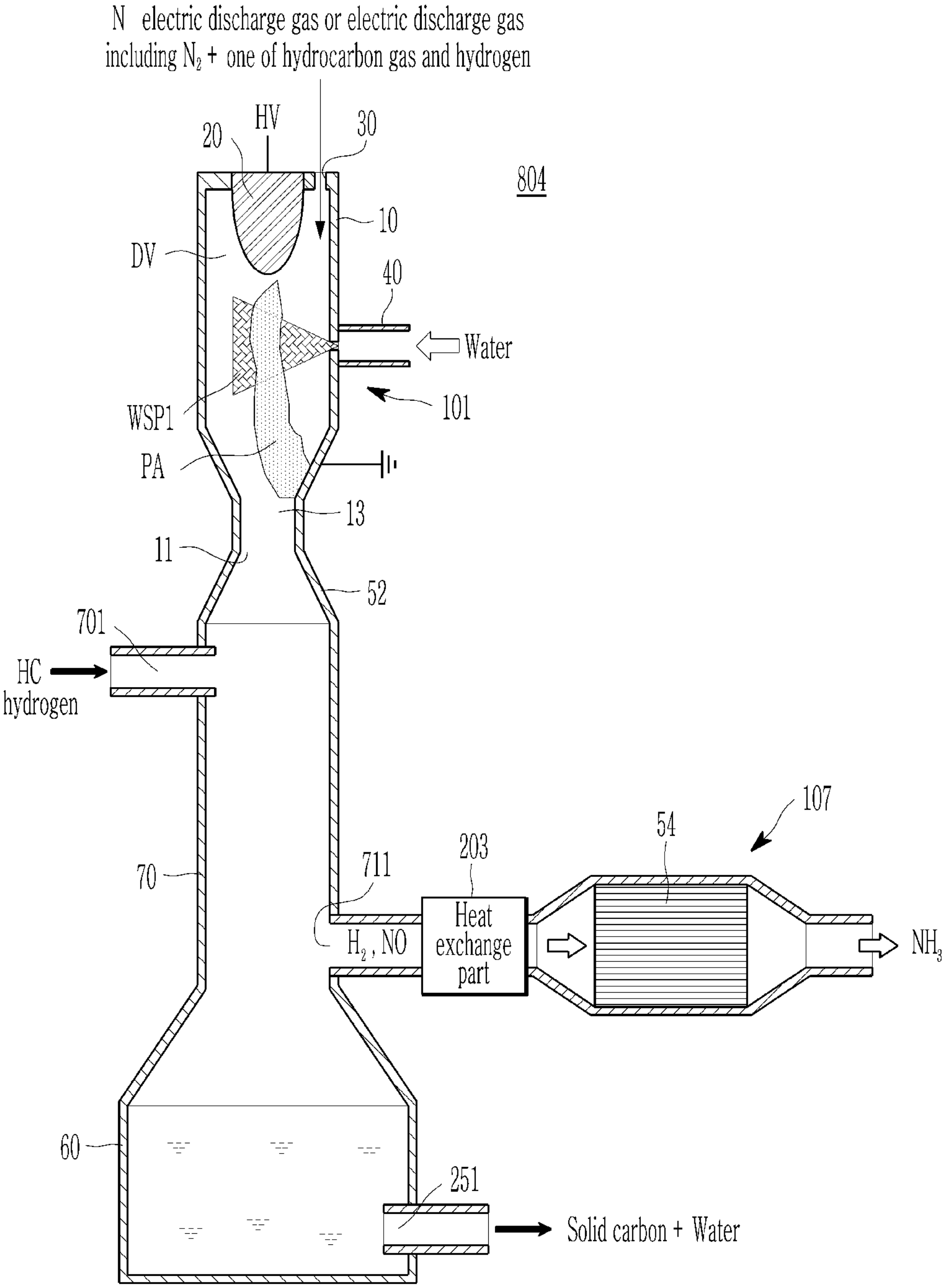
FIG. 14 is a configuration view of an apparatus for producing ammonia by using electric discharge of water according to an eleventh embodiment of the present invention.

FIG. 14 is a configuration view of an apparatus for producing ammonia by using electric discharge of water according to an eleventh embodiment of the present invention. Referring to FIG. 14, an apparatus 1 for producing ammonia by using electric discharge of water according to the eleventh embodiment further includes a heat exchange part 203.

The heat exchange part 203 is provided between the discharge port 711 and the synthetic catalyst part 108 provided on the extension part 70 of the thermal decomposition reaction part 108 and performs heat exchange on the product, which is supplied from the extension part 70, under a temperature condition suitable for the catalyst reaction of the ammonia synthesis.

Figure 15:
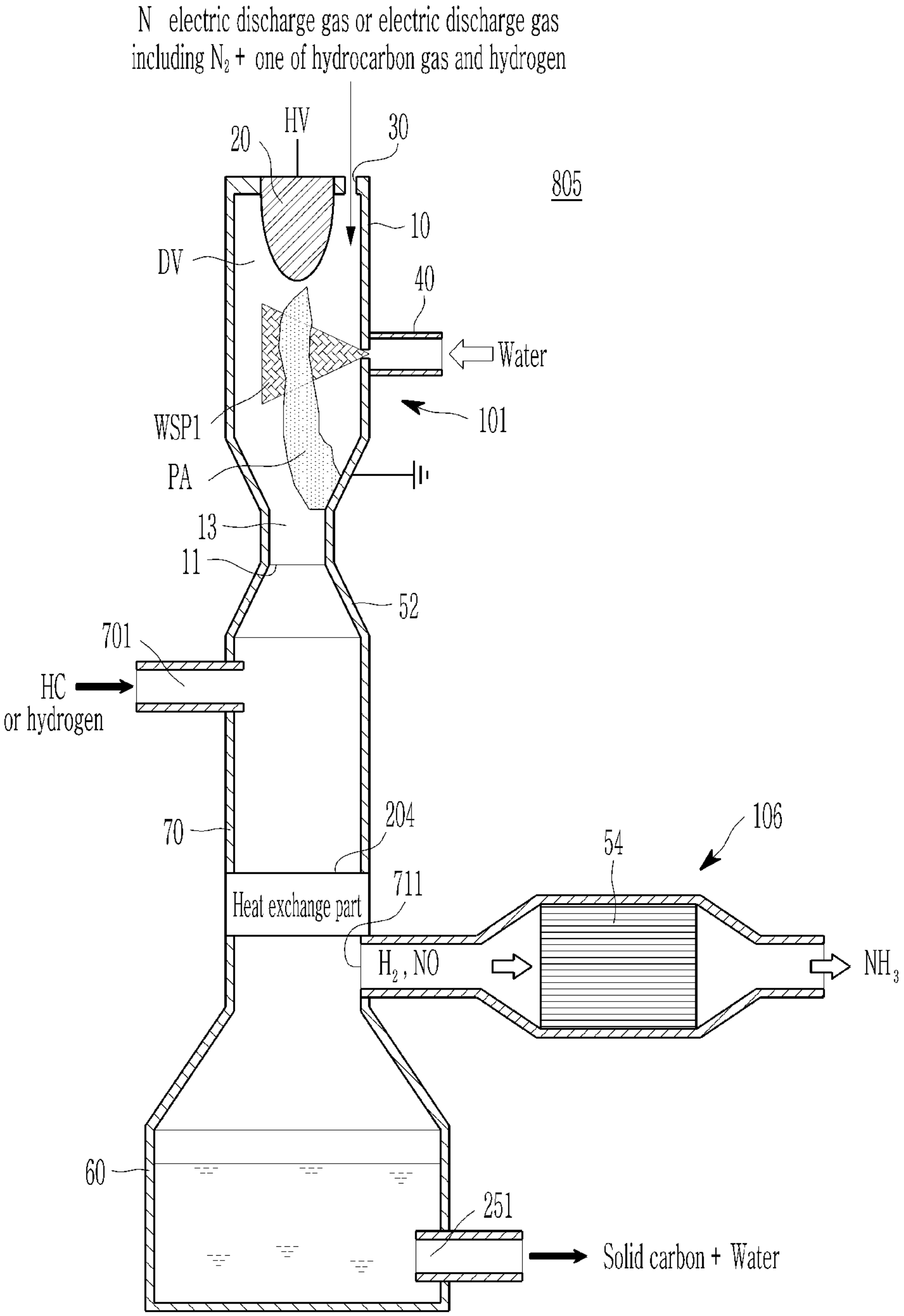
FIG. 15 is a configuration view of an apparatus for producing ammonia by using electric discharge of water according to a twelfth embodiment of the present invention.

FIG. 15 is a configuration view of an apparatus for producing ammonia by using electric discharge of water according to a twelfth embodiment of the present invention. Referring to FIG. 15, an apparatus 805 for producing ammonia by using electric discharge of water according to the twelfth embodiment further includes a heat exchange part 204.

The heat exchange part 204 is provided inside the extension part 70 of the thermal decomposition reaction part 108 and disposed above the discharge port 711 provided in the extension part 70 of the thermal decomposition reaction part 108 and performs heat exchange on the product, which is supplied from an upper portion of the extension part 70, under a temperature condition suitable for the catalyst reaction of the ammonia synthesis.

Figure 16:
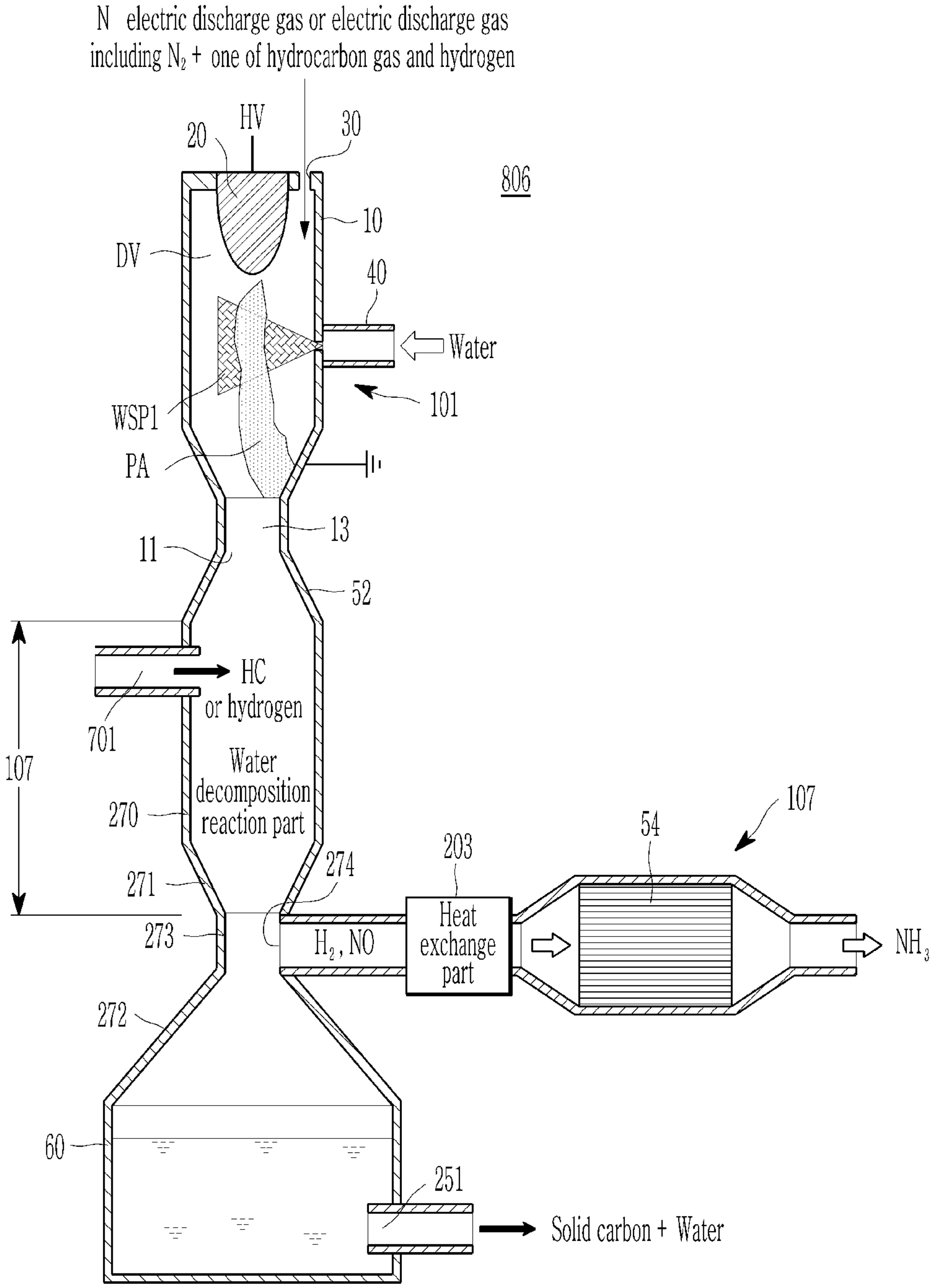
FIG. 16 is a configuration view of an apparatus for producing ammonia by using electric discharge of water according to a thirteenth embodiment of the present invention.

FIG. 16 is a configuration view of an apparatus for producing ammonia by using electric discharge of water according to a thirteenth embodiment of the present invention. Referring to FIG. 16, an apparatus 806 for producing ammonia by using electric discharge of water according to the thirteenth embodiment includes: a narrowed part 271 having a passageway which is narrowed between an extension part 270 of a thermal decomposition reaction part 107 and the recovery tub 60; a second expanded part 272 having a passageway which is widened between an extension part 270 of a thermal decomposition reaction part 107 and the recovery tub 60; and a second connection part 273 configured to connect the narrowed part 271 and the second expanded part 272 in a narrowed state.

In this case, the residue, which is not decomposed in the plasma decomposition reaction part 101, performs a cooling operation while flowing downward along walls of the connection part 13, the discharge port 11, the expanded part 52, the extension part 70, the narrowed part 271, the second connection part 273, the second expanded part 272, and the recovery tub 60 together with the supplied water. The cooling operation improves efficiency in cooling the exhaust gas discharged to the discharge port 711, and the exhaust gas is thermally controlled to a temperature more suitable for the catalyst reaction.

The synthetic catalyst part 106 is connected to the discharge port 274 provided in the second connection part 273, synthesizes hydrogen ($H_2$) and nitrogen monoxide (NO), which are thermally controlled and discharged, into ammonia ($NH_3$) by using the synthetic catalyst 54, and recovers the ammonia ($NH_3$).

While the exemplary embodiments of the present invention have been described above, the present invention is not limited thereto, and various modifications can be made and carried out within the scope of the claims, the detailed description of the invention, and the accompanying drawings, and also fall within the scope of the invention.

(Description of Reference Numerals)

| | |
|---|---|
| 1, 200, 300, 802, 803, 804, 805: Apparatus for producing ammonia | |
| 2, 3, 4, 5, 6, 7, 101: Plasma decomposition reaction part | |
| 10, 610: Housing | 11, 112, 531, 711, 274: Discharge port |
| 12, 271, 512: Narrowed part | |
| 13(273), 513: Connection part (second connection part) | |
| 20, 320, 420: High-voltage electrode | |
| 30: Electric discharge gas supply port | |
| 40, 41, 42: Water supply part | 43, 44, 45: Water supply part |
| 50: Carbon discharge port | 51: Catalyst part discharge port |
| 52, 272: Expanded part | 54: Synthetic catalyst |
| 60: Recovery tub | 70, 270: Extension part |
| 102, 106, 107: Synthetic catalyst part | |
| 103, 203, 204: Heat exchange part | |
| 104: Ammonia recovery part | 105: Gas separation part |
| 108, 109: Thermal decomposition reaction part | |
| 131: Inlet | |
| 132: Outlet | 510: Induced-coupled dielectric tube |
| 520: Electric discharge coil | 620: Microwave guide |
| 701: Additional supply port | ICP: Induced coupled plasma |
| DV, DV5: Electric discharge space | MWP: Microwave plasma |
| PA: Plasma arc | WSP1, WSP2, WSP3: Supplying (spraying) |
| WSP4, WSP5, WSP6, WSP7: Supplying (spraying) | |

The invention claimed is:

1. An apparatus for producing ammonia by using electric discharge of water, the apparatus comprising:

a plasma decomposition reaction part configured to produce hydrogen ($H_2$) and oxygen ($O_2$) from water by supplying the water to plasma generated by electric discharge gas including nitrogen gas ($N_2$) and any one of hydrocarbon gas and hydrogen, produce nitrogen monoxide (NO) and nitrogen dioxide ($NO_2$) by allowing oxygen ($O_2$) to react with nitrogen ($N_2$), and produce solid carbon and hydrogen ($H_2$) during a process of decomposing hydrocarbon;

a thermal decomposition reaction part connected to a lower side of the plasma decomposition reaction part and configured to produce solid carbon and hydrogen ($H_2$) by decomposing water and hydrocarbon; and a synthetic catalyst part connected to the thermal decomposition reaction part and configured to produce ammonia ($NH_3$) by synthesizing hydrogen ($H_2$) and nitrogen monoxide (NO) separated from water.

2. The apparatus of claim 1, wherein:

the thermal decomposition reaction part has an additional supply port, and hydrocarbon or hydrogen is further supplied to the additional supply port.

3. The apparatus of claim 2, further comprising:

a heat exchange part embedded in the thermal decomposition reaction part between the plasma decomposition reaction part and the synthetic catalyst part and configured to control a temperature to a temperature suitable for a catalyst reaction of the synthetic catalyst by cooling exhaust gas including nitrogen monoxide (NO), nitrogen dioxide ($NO_2$), and hydrogen ($H_2$) discharged from the plasma decomposition reaction part.

4. The apparatus of claim 3, wherein:

the heat exchange part absorbs heat of an internal space by using low-temperature water supplied to an inlet, and an outlet of the heat exchange part is connected to a water supply part configured to supply water to the plasma decomposition reaction part.

5. The apparatus of claim 3, further comprising:

an ammonia recovery part disposed at a downstream side of the synthetic catalyst part and configured to recover the synthesized ammonia ($NH_3$); and a gas separation part configured to separate hydrogen and nitrogen from exhaust gas having passed through the ammonia recovery part.

6. The apparatus of claim 2, wherein:

the plasma decomposition reaction part comprises:

a housing electrically grounded and having an electric discharge space therein and a discharge port having a narrowed passageway at an end thereof;

a high-voltage electrode mounted at one side of the housing, connected to high voltage, and configured to generate plasma electric discharge in the electric discharge space;

an electric discharge gas supply port configured to supply the electric discharge gas to one side of the high-voltage electrode;

a water supply part configured to produce hydrogen ($H_2$) and oxygen ($O_2$) from water by supplying water to plasma at a front side of the high-voltage electrode, produce nitrogen monoxide (NO) by allowing oxygen ($O_2$) to react with nitrogen ($N_2$), and discharge hydrogen ($H_2$) and nitrogen monoxide (NO) to the discharge port; and an expanded part connected to the discharge port and connected to an extension part of the thermal decomposition reaction part in a state in which a passageway is widened so that the solid carbon produced in the electric discharge space flows downward to the extension part together with the supplied water.

7. The apparatus of claim 2, further comprising:

a recovery tub provided below the thermal decomposition reaction part and configured to store the supplied water and the solid carbon between solid carbon and hydrogen ($H_2$) produced in the plasma decomposition reaction part and discharge the solid carbon to a carbon discharge port, wherein the synthetic catalyst part is connected to a discharge port provided at a lateral side of a lower end of the thermal decomposition reaction part.

8. The apparatus of claim 2, wherein:

the plasma decomposition reaction part comprises:

a housing electrically grounded having an electric discharge space therein and a discharge port provided at an end thereof;

a high-voltage electrode mounted at one side of the housing, connected to high voltage, and configured to generate plasma electric discharge in the electric discharge space;

an electric discharge gas supply port configured to supply the electric discharge gas to one side of the high-voltage electrode;

a connection part having a narrowed part having a narrowed passageway in the electric discharge space, and the discharge port connected to the narrowed part and provided at the end thereof;

a water supply part installed on the connection part at an end of the narrowed part and configured to produce hydrogen ($H_2$) and oxygen ($O_2$) from water by supplying the water to an end of a plasma arc of the plasma electric discharge, produce nitrogen monoxide (NO) by allowing oxygen ($O_2$) to react with nitrogen ($N_2$), and discharge hydrogen ($H_2$) and nitrogen monoxide (NO) to the discharge port; and an expanded part connected to the discharge port and connected to an extension part of the thermal decomposition reaction part in a state in which a passageway is widened so that the solid carbon produced in the electric discharge space flows downward to the extension part together with the supplied water.

9. The apparatus of claim 2, wherein:

the plasma decomposition reaction part comprises:

a housing electrically grounded and having an electric discharge space therein and a discharge port having a narrowed passageway at an end thereof;

a high-voltage electrode mounted at one side of the housing, connected to high voltage, and configured to generate plasma electric discharge in the electric discharge space;

an electric discharge gas supply port configured to supply the electric discharge gas to one side of the high-voltage electrode;

a water supply part formed on the high-voltage electrode and configured to produce hydrogen ($H_2$) and oxygen ($O_2$) from water by supplying the water to an outer periphery of a plasma arc of the plasma electric discharge, produce nitrogen monoxide (NO) by allowing oxygen ($O_2$) to react with nitrogen ($N_2$), and discharge hydrogen ($H_2$) and nitrogen monoxide (NO) to the discharge port; and an expanded part connected to the discharge port and connected to an extension part of the thermal decomposition reaction part in a state in which a passageway is widened so that the solid carbon produced in the electric discharge space flows downward to the extension part together with the supplied water.

10. The apparatus of claim 2, wherein:

the plasma decomposition reaction part comprises:

a housing electrically grounded and having an electric discharge space therein and a discharge port having a narrowed passageway at an end thereof;

a high-voltage electrode mounted at one side of the housing, connected to high voltage, and configured to generate plasma electric discharge in the electric discharge space;

an electric discharge gas supply port configured to supply the electric discharge gas to one side of the high-voltage electrode;

a water supply part formed on the high-voltage electrode and configured to produce hydrogen ($H_2$) and oxygen ($O_2$) from water by supplying the water to a front side of a plasma arc of the plasma electric discharge, produce nitrogen monoxide (NO) by allowing oxygen ($O_2$) to react with nitrogen ($N_2$), and discharge hydrogen ($H_2$) and nitrogen monoxide (NO) to the discharge port; and an expanded part connected to the discharge port and connected to an extension part of the thermal decomposition reaction part in a state in which a passageway is widened so that the solid carbon produced in the electric discharge space flows downward to the extension part together with the supplied water.

11. The apparatus of claim 9, wherein:

the water supply part comprises a water spray nozzle, and a tip of the water spray nozzle is positioned to be inserted into the high-voltage electrode.

12. The apparatus of claim 6, wherein:

the discharge port is configured as a nozzle having a converging-diverging structure and sprays water to plasma and nitrogen gas plasma so that a produced product is cooled while being discharged through the discharge port.

13. The apparatus of claim 2, wherein:

the plasma decomposition reaction part comprises:

an induced-coupled dielectric tube having an electric discharge space therein and a discharge port having a narrowed passageway at an end thereof;

an electric discharge coil provided at an outer periphery of the induced-coupled dielectric tube and configured to generate induced coupled plasma electric discharge in the electric discharge space;

an electric discharge gas supply port configured to supply electric discharge gas including hydrocarbon gas and nitrogen gas ($N_2$) to one side of the induced-coupled dielectric tube;

a water supply part configured to produce hydrogen ($H_2$) and oxygen ($O_2$) from water by supplying the water to induced coupled plasma in the electric discharge space, produce nitrogen monoxide (NO) by allowing oxygen ($O_2$) to react with nitrogen ($N_2$), and discharge hydrogen ($H_2$) and nitrogen monoxide (NO) to the discharge port; and an expanded part connected to the discharge port and connected to an extension part of the thermal decomposition reaction part in a state in which a passageway is widened so that the solid carbon produced in the electric discharge space flows downward to the extension part together with the supplied water.

14. The apparatus of claim 2, wherein:

the plasma decomposition reaction part comprises:

an induced-coupled dielectric tube having an electric discharge space therein and a discharge port having a narrowed passageway at an end thereof;

an electric discharge coil provided at an outer periphery of the induced-coupled dielectric tube and configured to generate induced coupled plasma electric discharge in the electric discharge space;

an electric discharge gas supply port configured to supply electric discharge gas including hydrocarbon gas and nitrogen gas ($N_2$) to one side of the induced-coupled dielectric tube;

a water supply part provided at a front side of the electric discharge coil based on a longitudinal direction of the induced-coupled dielectric tube, the water supply part being configured to produce hydrogen ($H_2$) and oxygen ($O_2$) from water by supplying the water to induced coupled plasma in the electric discharge space, produce nitrogen monoxide (NO) by allowing oxygen ($O_2$) to react with nitrogen ($N_2$), and discharge hydrogen ($H_2$) and nitrogen monoxide (NO) to the discharge port; and an expanded part connected to the discharge port and connected to an extension part of the thermal decomposition reaction part in a state in which a passageway is widened so that the solid carbon produced in the electric discharge space flows downward to the extension part together with the supplied water.

15. The apparatus of claim 2, wherein:

the plasma decomposition reaction part comprises:

a housing having an electric discharge space therein and a discharge port narrowed at an end thereof;

a microwave guide provided outside the housing and configured to generate microwave plasma in the electric discharge space;

an electric discharge gas supply port configured to supply the electric discharge gas to one side of the housing;

a water supply part configured to produce hydrogen ($H_2$) and oxygen ($O_2$) from water by supplying the water to plasma in the electric discharge space, produce nitrogen monoxide (NO) by allowing oxygen ($O_2$) to react with nitrogen ($N_2$), and discharge hydrogen ($H_2$) and nitrogen monoxide (NO) to the discharge port; and an expanded part connected to the discharge port and connected to an extension part of the thermal decomposition reaction part in a state in which a passageway is widened so that the solid carbon produced in the electric discharge space flows downward to the extension part together with the supplied water.

16. The apparatus of claim 2, further comprising:

a recovery tub connected to the thermal decomposition reaction part and configured to store the supplied water and the solid carbon between solid carbon and hydrogen ($H_2$) produced in the plasma decomposition reaction part and the water decomposition reaction part to a carbon discharge port, wherein the synthetic catalyst part is connected to a discharge port provided in a connection part of the plasma decomposition reaction part.

17. The apparatus of claim 2, further comprising:

a heat exchange part provided between a discharge port of the thermal decomposition reaction part and the synthetic catalyst part.

18. The apparatus of claim 2, further comprising:

a heat exchange part disposed above a discharge port of the thermal decomposition reaction part and provided inside the thermal decomposition reaction part.

19. The apparatus of claim 2, wherein:

the thermal decomposition reaction part and a recovery tub are connected by a contracted part having a narrowed passageway and a second expanded part having a widened passageway, and the contracted part and the second expanded part are connected by a narrowed second connection part, and wherein the synthetic catalyst part is connected to a discharge port provided in the second connection part.

20. The apparatus of claim 10, wherein:
the water supply part comprises a water spray nozzle, and
a tip of the water spray nozzle is positioned to be inserted into the high-voltage electrode.

* * * * *